US011088846B2

(12) United States Patent
Chhabra et al.

(10) Patent No.: US 11,088,846 B2
(45) Date of Patent: Aug. 10, 2021

(54) KEY ROTATING TREES WITH SPLIT COUNTERS FOR EFFICIENT HARDWARE REPLAY PROTECTION

(71) Applicant: Intel Corporation, Santa Clara, CA (US)

(72) Inventors: Siddhartha Chhabra, Portland, OR (US); Rajat Agarwal, Portland, OR (US); David M. Durham, Beaverton, OR (US)

(73) Assignee: INTEL CORPORATION, Santa Clara, CA (US)

(*) Notice: Subject to any disclaimer, the term of this patent is extended or adjusted under 35 U.S.C. 154(b) by 322 days.

(21) Appl. No.: 16/368,810

(22) Filed: Mar. 28, 2019

(65) Prior Publication Data
US 2019/0229924 A1    Jul. 25, 2019

(51) Int. Cl.
| H04L 29/06 | (2006.01) |
| H04L 9/32 | (2006.01) |
| H04L 9/00 | (2006.01) |
| H04L 9/08 | (2006.01) |
| H04L 9/06 | (2006.01) |
| H04L 9/16 | (2006.01) |

(52) U.S. Cl.
CPC .......... *H04L 9/3242* (2013.01); *H04L 9/005* (2013.01); *H04L 9/0637* (2013.01); *H04L 9/0836* (2013.01); *H04L 9/16* (2013.01); *H04L 63/068* (2013.01); *H04L 63/123* (2013.01); *H04L 63/1475* (2013.01)

(58) Field of Classification Search
CPC . H04L 9/3242; H04L 63/1475; H04L 63/068; H04L 63/123; H04L 9/005; H04L 9/0836; H04L 9/0637; H04L 9/16; H04L 2209/38
See application file for complete search history.

(56) References Cited

U.S. PATENT DOCUMENTS

| 4,758,946 A | * | 7/1988 | Shar | .................... G06F 12/1009 711/206 |
| 5,673,316 A | * | 9/1997 | Auerbach | ................. G07F 7/08 705/51 |

(Continued)

FOREIGN PATENT DOCUMENTS

CN    101159556 A  *  4/2008

*Primary Examiner* — John B King
(74) *Attorney, Agent, or Firm* — Jaffery Watson Mendonsa & Hamilton LLP

(57) ABSTRACT

In one example a computer implemented method comprises encrypting data to be stored in a protected region of a memory using a message authentication code (MAC) having a first value determined using a first key during a first period of time, generating a replay integrity tree structure comprising security metadata for the data stored in the protected region of the memory using the first value of the MAC, and at the end of the first period of time, re-keying the MAC to have a second value determined using a second key at the end of the first period of time, decrypting the data stored in the protected region using the first value for the MAC, re-encrypting the data stored in the protected region using the second value for the MAC, and updating the replay integrity tree using the second value for the MAC. Other examples may be described.

21 Claims, 26 Drawing Sheets

(56) References Cited

U.S. PATENT DOCUMENTS

| | | | | |
|---|---|---|---|---|
| 5,956,756 A * | 9/1999 | Khalidi | G06F 12/1027 | 711/207 |
| 8,104,089 B1 * | 1/2012 | Guo | G06F 12/145 | 726/24 |
| 8,688,954 B2 * | 4/2014 | Davis | G11C 29/76 | 711/209 |
| 8,819,455 B2 * | 8/2014 | Chhabra | G06F 21/71 | 713/193 |
| 9,448,950 B2 * | 9/2016 | Scarlata | G06F 21/74 | |
| 9,934,148 B2 * | 4/2018 | Roberts | G06F 12/0862 | |
| 10,243,990 B1 * | 3/2019 | Chen | G06F 21/71 | |
| 10,380,352 B2 * | 8/2019 | Avery | G06F 16/21 | |
| 10,380,353 B2 * | 8/2019 | Avery | G06F 21/602 | |
| 2004/0093479 A1 * | 5/2004 | Ramchandran | G06F 9/3826 | 712/210 |
| 2005/0144388 A1 * | 6/2005 | Newburn | G06F 12/0886 | 711/118 |
| 2007/0130470 A1 * | 6/2007 | Blom | G06F 21/64 | 713/181 |
| 2009/0031142 A1 * | 1/2009 | Halevi | G06F 12/1408 | 713/190 |
| 2009/0198952 A1 * | 8/2009 | Khmelnitsky | G06F 12/0246 | 711/206 |
| 2010/0106920 A1 * | 4/2010 | Anckaert | G06F 12/1408 | 711/154 |
| 2010/0296651 A1 * | 11/2010 | Tkacik | H04L 9/0894 | 380/44 |
| 2011/0153944 A1 * | 6/2011 | Kursawe | G06F 12/0802 | 711/122 |
| 2011/0202740 A1 * | 8/2011 | Grisenthwaite | G06F 12/145 | 711/163 |
| 2012/0290842 A1 * | 11/2012 | Artishdad | H04L 67/06 | 713/168 |
| 2012/0311317 A1 * | 12/2012 | Elrod | H04L 9/0822 | 713/150 |
| 2013/0145160 A1 * | 6/2013 | Bursell | G06F 21/6218 | 713/168 |
| 2014/0101461 A1 * | 4/2014 | Chhabra | G06F 21/71 | 713/193 |
| 2014/0258805 A1 * | 9/2014 | Casado | H03M 13/35 | 714/758 |
| 2014/0380009 A1 * | 12/2014 | Lemay | G06F 9/45558 | 711/163 |
| 2015/0089173 A1 * | 3/2015 | Chhabra | G06F 9/45558 | 711/163 |
| 2016/0085695 A1 * | 3/2016 | Leslie-Hurd | G06F 21/79 | 711/163 |
| 2016/0117265 A1 * | 4/2016 | McKeen | G06F 12/0804 | 711/102 |
| 2016/0179702 A1 * | 6/2016 | Chhabra | G06F 13/1605 | 713/193 |
| 2016/0283750 A1 * | 9/2016 | Durham | G06F 21/79 | |
| 2016/0328335 A1 * | 11/2016 | Bhattacharyya | H04L 9/3242 | |
| 2017/0293534 A1 * | 10/2017 | Auvenshine | G06F 11/1464 | |
| 2017/0337136 A1 * | 11/2017 | Basu | G06F 12/1009 | |
| 2018/0091308 A1 * | 3/2018 | Durham | G06F 12/1408 | |
| 2018/0211046 A1 * | 7/2018 | Muttik | G06F 21/577 | |
| 2018/0365141 A1 * | 12/2018 | Dragojevic | G06F 12/0238 | |

* cited by examiner

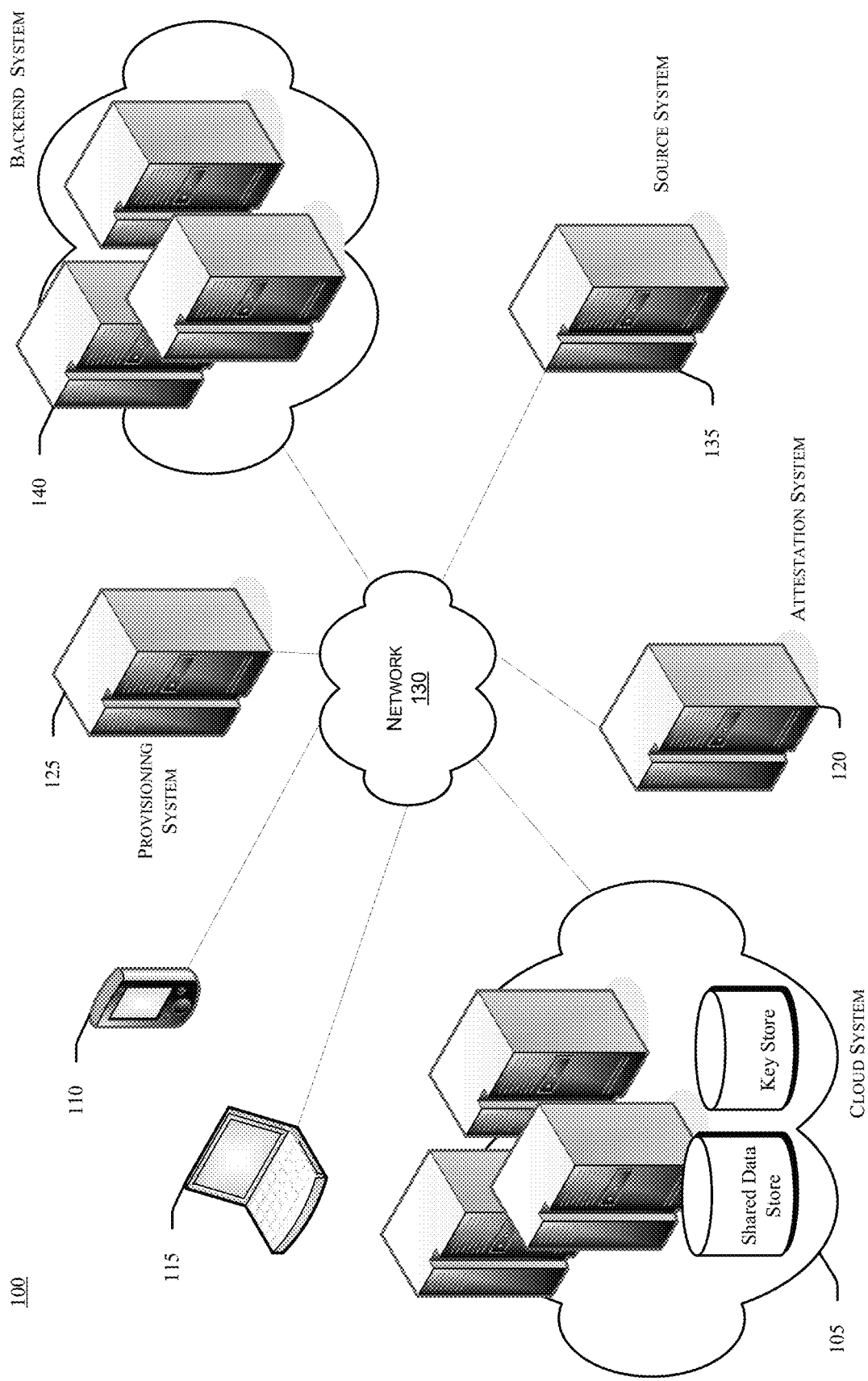

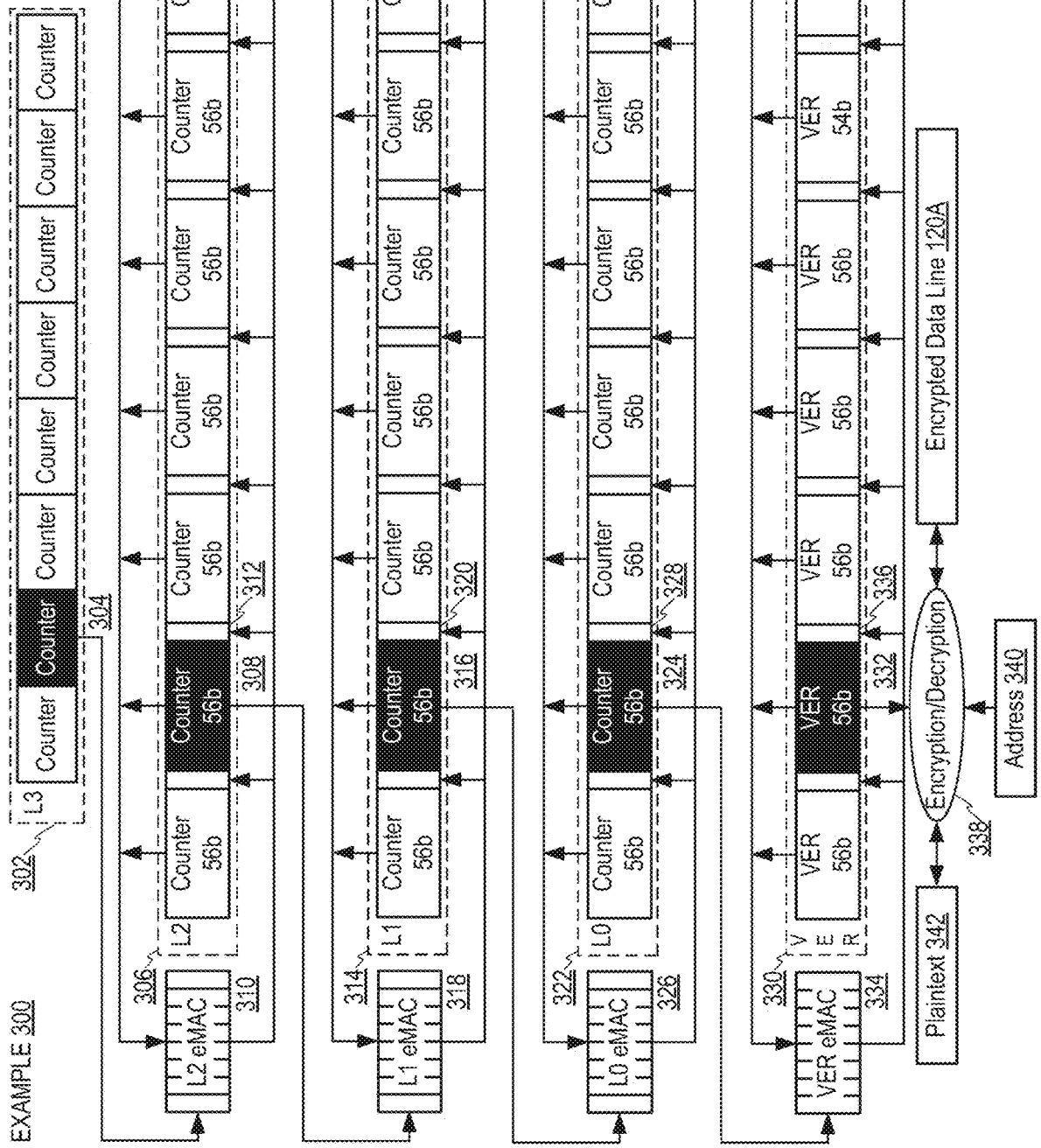

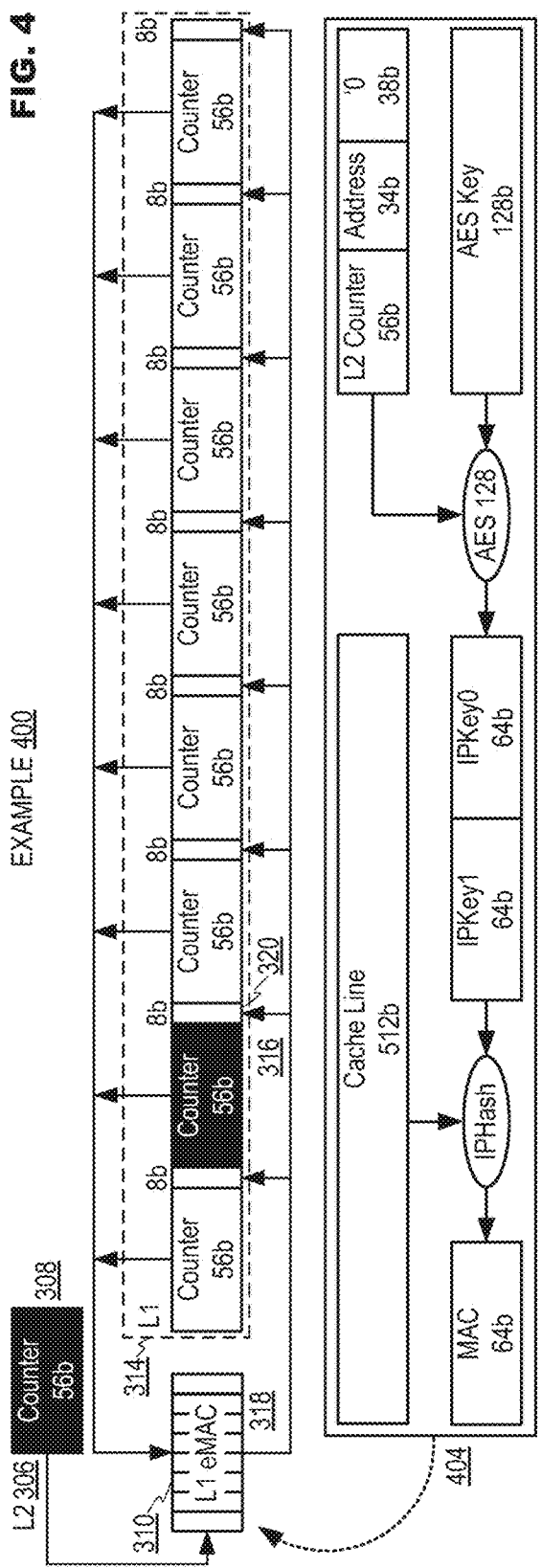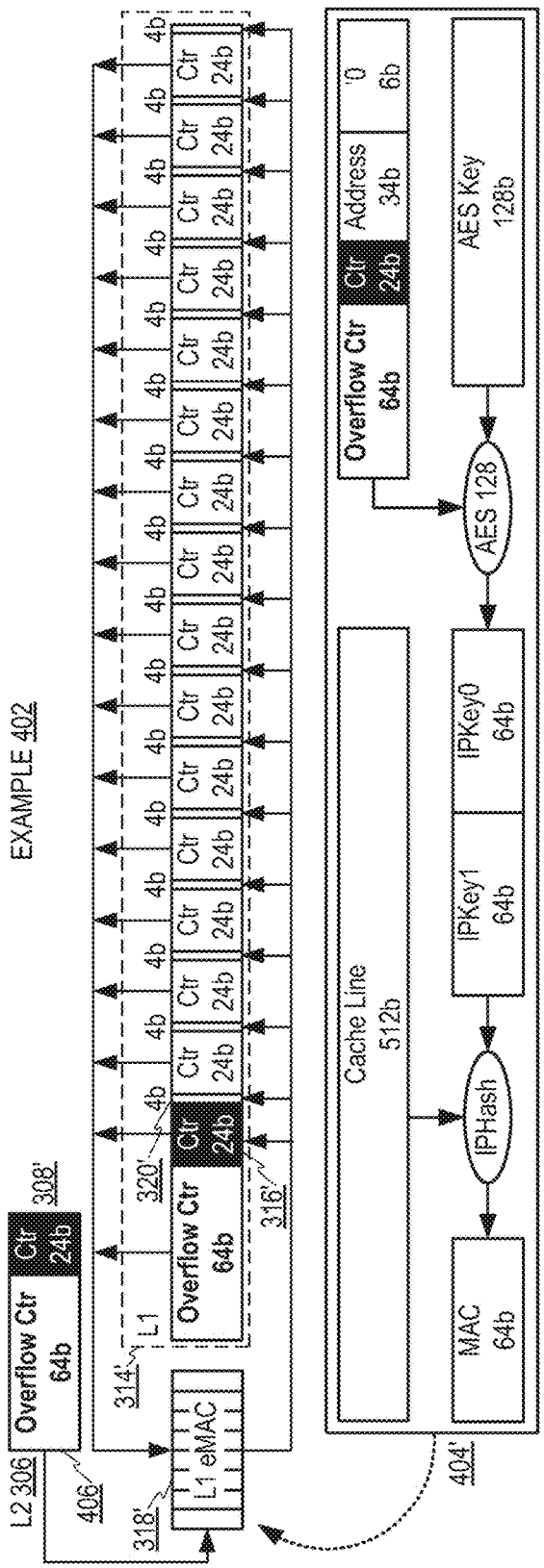
FIG. 4

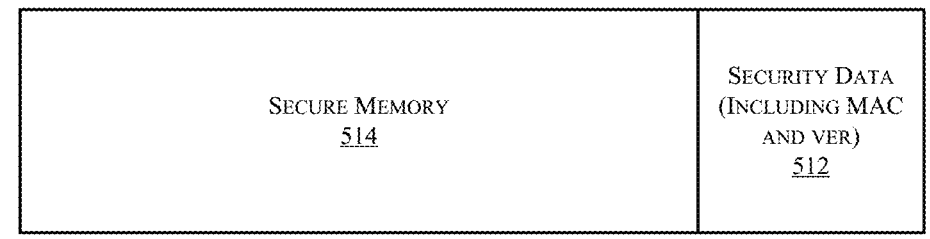
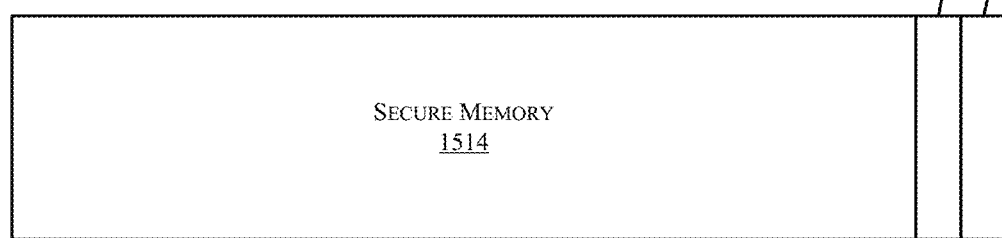
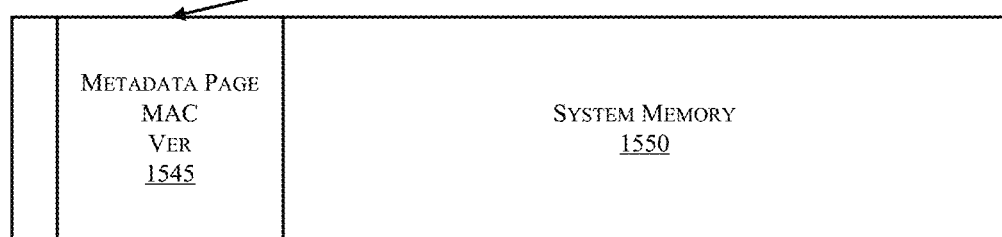
FIG. 15

KEY ROTATING TREES WITH SPLIT COUNTERS FOR EFFICIENT HARDWARE REPLAY PROTECTION

BACKGROUND

Subject matter described herein relates generally to the field of electronic devices and more particularly to implementing security in computing environments.

Computing systems, such as hardware systems and software systems that run on computers often have undetected flaws that can be exploited by hardware attacks or software attacks, such as malicious computer programs that are received over the Internet or other communication networks. The hardware attacks and software attacks can include Trojans, viruses, worms, spyware, and other malware. Many existing computer security systems combat hardware attacks and software attacks by attempting to prevent the attacks from compromising any part of the computer system. Computing systems may be provided with features to protect sensitive data in memory from both hardware attacks and software attacks. Some processors provide cryptographic mechanisms for encryption, integrity, and replay protection. Memory encryption protects the confidentiality of memory-resident data. Integrity protection prevents an attacker from causing any hidden modifications to the ciphertext (i.e., encrypted data, as opposed to plaintext that is unencrypted data) in memory. Replay protection eliminates any undetected temporal substitution of the ciphertext. In the absence of encryption, integrity, and replay protections, an attacker with physical access to the system can record snapshots of cache lines and replay the cache lines at a later point in time to modify the cache lines and attack the computer system.

Accordingly, techniques to implement computer security may find utility.

BRIEF DESCRIPTION OF THE DRAWINGS

The detailed description is described with reference to the accompanying figures.

FIGS. 1A and 1B are schematic illustrations of a computing environment in accordance with some embodiments.

FIG. 3 illustrates an example structure for a counter system in accordance with at least one embodiment.

FIG. 4 illustrates example operations for calculating an embedded memory authentication code for the counter system structure illustrated in FIG. 3 and also for a flexible counter structure in accordance with at least one embodiment.

FIG. 15 is a schematic illustration of key rotation in accordance with some embodiments.

DETAILED DESCRIPTION

Figure 1B:
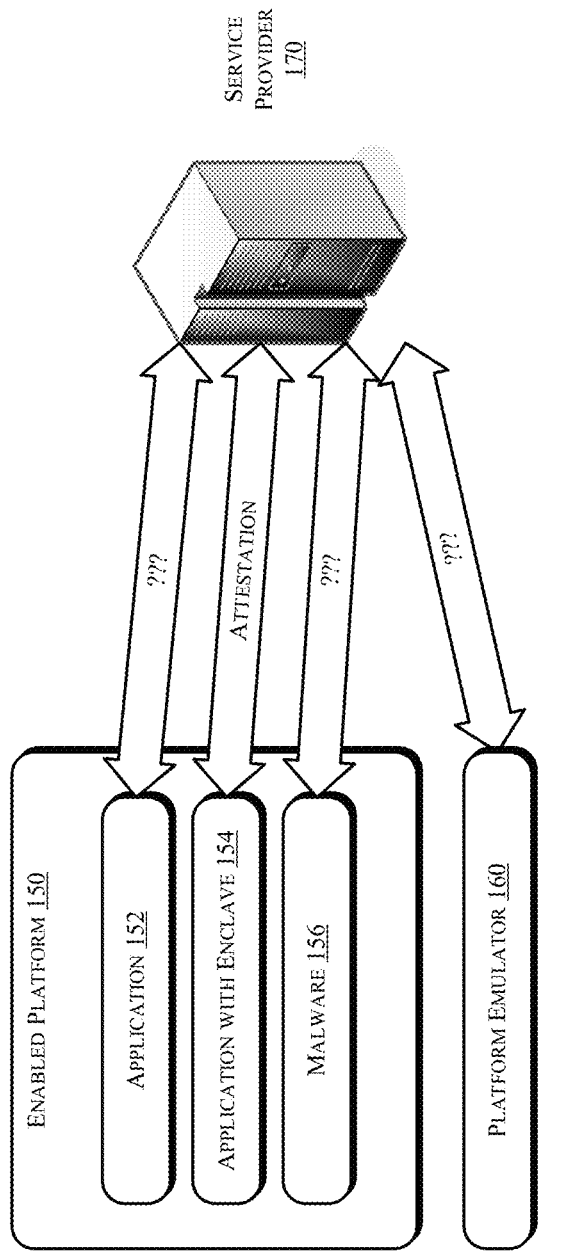

Described herein are exemplary systems and methods to implement key rotating trees with split counters for efficient hardware replay protection. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the particular examples.

As used herein, the term "plaintext" will be used to describe unencrypted sensitive (i.e., vulnerable) data stored in main memory of an electronic device. By contrast, the term "ciphertext" will be used to describe encrypted (protected) data stored in memory.

The acronym LLC will be used herein to refer to Last Level Cache. The acronym MAC will be used to refer to a Message Authentication Code. The phrase data line and/or cache line will be used to refer to a line of data stored in the main memory.

The acronym MEE will be used to refer to a Memory Encryption Engine. A MEE embodies two primary cryptographic mechanisms, encryption and integrity/replay protection designed to defend against passive and active attacks respectively. The phrase "MEE Region and/or Protected Region" will be used to refer to a Memory range cryptographically protected by a MEE.

As described above, computing systems may be provided with features to protect sensitive data in memory from both hardware attacks and software attacks. Some processors provide cryptographic mechanisms for encryption, integrity, and replay protection. Memory encryption protects the confidentiality of memory-resident data. Integrity protection prevents an attacker from causing any hidden modifications to the ciphertext (i.e., encrypted data, as opposed to plaintext that is unencrypted data) in memory. Replay protection eliminates any undetected temporal substitution of the ciphertext. In the absence of encryption, integrity, and replay protections, an attacker with physical access to the system can record snapshots of cache lines and replay the cache lines at a later point in time to modify the cache lines and attack the computer system.

To address these and other issues, some computing devices provide a trusted execution environment (TEE) which are designed to protect third-party secrets from both hardware and software attacks on an open (i.e., untrusted) platform. To protect the confidentiality of the secrets, the trusted execution environment stores them in an encrypted form when resident in platform memory. For complete protection, some trusted execution environments also provide replay-protection and integrity protection to resist hardware attacks. Without such protections, an attacker with physical access to the system can use snapshots of encrypted secret data and replay them later, a process referred to as a replay attack. To achieve these protections, some trusted execution environments comprise a Memory Encryption Engine (MEE) that provides cryptographic mechanisms for encryption, integrity and replay protection. The memory protection offered by the memory encryption engine is equally important in cloud environments.

Computing Environment

FIG. 1A is a simplified block diagram illustrating an example embodiment of a computing environment 100 including a network of computing devices, at least some of which include logic, implemented in hardware circuitry, firmware, and/or software to implement a counter mode encryption scheme to protect data within the system. Protected memory regions may be implemented utilizing such functionality. As one example, illustrated in FIG. 1A, a cloud-based computing system 105 can be implemented to facilitate on-demand and distributed computing resource, which in some cases may be made available to various consumers. The cloud system 105 may include multiple computing resources, which may be selectively utilized to host various applications, data, and services. For instance, the cloud system 105 may be composed of multiple, distinct host computing systems, which may each be used to host one or more virtual resources. A virtual resource, within this disclosure, may refer to a virtual machine, container, or other virtual execution environment in which another software application, program, microservice, or software component may be hosted and run. In some implementations, virtual resources may emulate a private server (e.g., of a customer or other consumer), and the virtual machines may be deployed to host various applications and services. The cloud system 105 may include a controller, or scaling manager, to allow the amount of resources of the cloud dedicated to a particular application, service, and/or consumer to be scaled-up (i.e., allocate more resources to the service) to adjust to increasing demand (or a predicted increase in demand). Likewise, the scaling manager may scale-down (i.e., subtract) the cloud system resources of an application in response to a real or predicted decrease in demand for the application, among other examples.

In some cases, one or more consumer source systems (e.g., 135) may interact with cloud system 105 resources or other host systems 110, 115 to act as a source for various applications, data, virtual machine images, and even secrets and keys. For instance, a source system 135 may provide at least a portion of a virtual machine image to run a particular application instance to cloud system 105 in connection with the hosting and scaling of the particular application on the cloud system 105. Likewise, the source system may allow consumers to specify particular secret data and/or keys, which a particular consumer may desire to be used in connection with an application and/or virtual machine sourced from the source system 135, among other examples.

In some implementations, a cloud system 105 may include host computing systems (or platforms) to be equipped with functionality to support secure logical components, or enclaves, to allow virtual machines to be hosted, which themselves include such secure enclaves, allowing applications and data hosted on the virtual machine to be secured through one or more secure enclaves implemented using a counter mode encryption scheme. Indeed, the virtual machine of such a system may likewise include secure enclaves. A secure enclave may be embodied as a set of instructions (e.g., implemented in microcode or extended microcode) that provides a safe place for an application to execute code and store data inside in the context of an operating system (OS) or other process. An application that executes in this environment may be referred to as an enclave. Enclaves are executed from a secure enclave cache. In some implementations, pages of the enclave may be loaded into the cache by an OS. Whenever a page of an enclave is removed from the secured cache, cryptographic protections may be used to protect the confidentiality of the enclave and to detect tampering when the enclave is loaded back into the cache, such as discussed herein. Inside the cache, enclave data may be protected using access control mechanisms provided by the processor. The enclave cache may be where enclave code is executed and protected enclave data is accessed.

In some implementations, a secure memory region can implement memory for use in secure enclaves, or the enclave cache. Accordingly, the enclave cache may be located within the physical address space of a platform but can be accessed only using secure enclave instructions. A single enclave cache may contain pages from many different enclaves and provides access control mechanism to protect the integrity and confidentiality of the pages. The enclave cache can be instantiated in several ways. For instance, the cache may be constructed of dedicated SRAM on the processor package. The enclave cache may be implemented in cryptographically protected volatile storage using platform DRAM. The cache may use one or more strategically placed cryptographic units in the CPU core to provide varying levels of protection. The various core agents may be modified to recognize the memory accesses going to the cache, and to route those accesses to a crypto controller located in the core. The crypto controller, depending on the desired protection level, generates one or more memory accesses to the platform DRAM to fetch the cipher-text. It may then process the cipher-text to generate the plain-text, and satisfy the original cache memory request, among other example implementations and features.

In some implementations, when a platform loads an enclave it may call a system routine in the operating system. The system may attempt to allocate some pages in the enclave cache. In some implementations, if there is no open space in the cache, the OS may select some protected cache lines for removal, such as through the removal of a corresponding "victim" enclave. In some implementations, additional secure memory may be allocated (e.g., by expanding the secure memory region) by converting pages to secured pages. Likewise, the system may add secure enclaves control structure (SECS) to the cache. With the SECS created, the system may add pages to the enclave as requested by the application. A secure enclave SECS is said to be active if it is currently loaded into the cache. In some implementations, a secure enclave may be implemented in a virtual machine. A corresponding OS, virtual machine manager (VMM), etc., may be responsible for managing what gets loaded into the EPC. In some implementations, while loading an enclave page into the EPC, the OS/VMM may inform the CPU the whereabouts of the SECS for that page, except when the page under consideration itself is an SECS. When the page being loaded is not an SECS, the SECS corresponding to the page may be located inside the EPC. Before loading any page for an enclave, the OS/VMM may load the SECS for that enclave into the EPC.

Secure enclaves may be used, in some instances, to seal, or secure, private or secret data utilized by an application or virtual machine, for instance, by encryption using hardware-based or other encryption keys. In some implementations, a specialized secure enclave may be provided to manage keys for a virtual machine (e.g., in connection with a key store provided on the cloud system 105). Secure enclaves may be further utilized to perform attestation of various components of a virtual machine and the application(s) it hosts. Attestation may be the process of demonstrating that a piece of software has been established on the platform especially to a remote entity. In the case of secure enclaves, attestation is the mechanism by which a remote platform establishes that software is running on an authentic (i.e., secure enclave enabled) platform protected within an enclave prior to trusting that software with secrets and protected data. The process of attestation can include measurement of the secure enclave and its host, storage of the measurement results (e.g., in a corresponding SECS), and reporting of measurements (with potentially additional information) through quotes to prove the authenticity of the secure enclave to another entity.

In some implementations, one or more attestation systems (e.g., 120) may be provided, which may receive attestation data, or "quotes," generated by secure enclaves running on host systems of the cloud system 105 or even other non-cloud host systems (e.g., 110, 115) to prove or attest to the authenticity and security (and other characteristics) of another application or enclave of the host. An attestation system 120 may process data, including signatures, included in the quote to verify the trustworthiness of the secure enclave (and its platform) and confirm the attestation based on the received quote.

In general, host systems (e.g., 105, 110, 115) can host applications and services and attestation of the host system may be utilized to establish the trustworthiness of both an application or service, a secure enclave provided on the host, as well as the host system itself. In the case of applications or services implemented through one or more virtual machines hosted on one or more host systems (e.g., of cloud system 105), secure enclaves may likewise be provided in the virtual machines and the applications they host to similarly allow these "host" virtual machines (and their applications) to reliably and securely attest to their authenticity and trustworthiness. As noted, attestations may be facilitated through quotes that identify attributes of the system, an application, and/or an enclave that is being attested to through the quote. The quote may additionally be signed or include data that has been signed by a cryptographic key (or key pair), cipher, or other element (collectively referred to herein as "key") from which the attestation system can authenticate or confirm the trustworthiness of the quote (and thereby also the application or enclave attested to by the quote). Such keys can be referred to as attestation keys. A provisioning system 125 can be utilized to securely provision such attestation keys on the various host devices (e.g., 105, 110, 115), virtual machines, and/or enclaves. Provisioning systems and services may also be utilized to facilitate the provisioning or generation of sealing keys for use in sealing secret data generated or entrusted to an application or virtual machine. Such secret data may be sealed (e.g., in a shared storage element within the cloud system 105) such that it may securely maintained and made available for later access, such as when a virtual machine and application are deconstructed, or scaled-down, and later re-instantiated during scale-up, among other examples.

In some cases, attestation can be carried out in connection with a client-server or frontend-backend interaction (e.g., over one or more networks 130) between an application hosted on a host system (e.g., 105, 110, 115) and a backend service hosted by a remote backend system (e.g., 140). Sensitive data and transactions can take place in such interactions and the application can attest to its trustworthiness and security to the backend system (and vice versa) using an attestation system (e.g., 120). In some implementations, the attestation system itself can be hosted on the backend system. In other cases, a backend system (e.g., 140) (or even another host device in a peer-to-peer attestation) can consume the attestation services of a separate attestation system (e.g., 105). Attestation to a backend system 140 can facilitate access to higher privileges, sensitive data, keys, services, etc. that are restricted to other systems unable to attest to their trust level. Indeed, secret data maintained at an application may include secrets entrusted with an application or virtual machine by a backend service (e.g., 140) based on successful attestation of the application or virtual machine, among other examples.

A provisioning system 125 can maintain a database or other repository of certificates mapped to various host platforms (e.g., 105, 110, 115) or virtual machines equipped to implement trusted execution environments, or secure enclaves. Each of the certificates can be derived from keys, such as root keys, established for the host devices or virtual machines. Such keys may themselves be based on persistently maintained, secure secrets provisioned on the host devices during manufacture. In the case of virtual machines or platforms employing multiple devices (e.g., such as a server architecture) the secret may be established for the virtual machine and platform and registered with a registration system 130, among other examples. The root keys or secrets remain secret to the host platform or virtual machine and may be implemented as fuses, a code in secure persistent memory, among other implementations. The key may be the secret itself or a key derived from the secret. The certificate may not identify the key and the key may not be derivable from the certificate, however, signatures produced by the key (e.g., and included in a quote) may be identified as originating from a particular one of the host platforms or virtual machines for which a certificate is maintained based on the corresponding certificate. In this manner, a host system (e.g., 105, 110, 115) or virtual machines hosted thereon can authenticate to the provisioning system 125 and be provided (by the provisioning system 125) with attestation keys, root keys, sealing keys, and other cryptographic structures, which the provisioning system 125 may further and securely associate with the host device or virtual machine. These attestation keys can then be used by secure enclaves on the corresponding host systems (e.g., 105, 110, 115) or virtual machine to perform attestation for one or more applications or enclaves present on the host device.

Various host platforms may interact with an attestation system (e.g., 120), provisioning systems (e.g., 125), source system (e.g., 135), and backend systems (e.g., 140) over one or more networks (e.g., 130). Networks 130, in some implementations, can include local and wide area networks, wireless and wireline networks, public and private networks, and any other communication network enabling communication between the systems. Further, two or more of attestation systems (e.g., 120), provisioning systems (e.g., 125), and backend systems (e.g., 140) may be combined in a single system. Communications over the networks 130 interconnecting these various systems (e.g., 105, 110, 115, 120, 125, 135, 140) may be secured. In some cases, a secure enclave on a host (e.g., 105, 110, 115, etc.) may initiate a communication with an attestation system 120, provisioning systems (e.g., 125), and/or source systems (e.g., 135) using a secure channel, among other examples.

In general, "servers," "devices," "computing devices," "host devices," "user devices," "clients," "servers," "computers," "platforms," "environments," "systems," etc. (e.g., 105, 110, 115, 120, 125, 135, 140, etc.) can include electronic computing devices operable to receive, transmit, process, store, or manage data and information associated with the computing environment 100. As used in this document, the term "computer," "computing device," "processor," or "processing device" is intended to encompass any suitable processing device adapted to perform computing tasks consistent with the execution of computer-readable instructions. Further, any, all, or some of the computing devices may be adapted to execute any operating system, including Linux, UNIX, Windows Server, etc., as well as virtual machines adapted to virtualize execution of a particular operating system, including customized and proprietary operating systems. Computing devices may be further equipped with communication modules to facilitate communication with other computing devices over one or more networks (e.g., 130).

Host devices (e.g., 110, 115) can further include computing devices implemented as one or more local and/or remote client or end user devices, such as application servers, personal computers, laptops, smartphones, tablet computers, personal digital assistants, media clients, web-enabled televisions, telepresence systems, gaming systems, multimedia servers, set top boxes, smart appliances, in-vehicle computing systems, and other devices adapted to receive, view, compose, send, or otherwise interact with, access, manipulate, consume, or otherwise use applications, programs, and services served or provided through servers within or outside the respective device (or environment 100). A host device can include any computing device operable to connect or communicate at least with servers, other host devices, networks, and/or other devices using a wireline or wireless connection. A host device, in some instances, can further include at least one graphical display device and user interfaces, including touchscreen displays, allowing a user to view and interact with graphical user interfaces of applications, tools, services, and other software of provided in environment 100. It will be understood that there may be any number of host devices associated with environment 100, as well as any number of host devices external to environment 100. Further, the term "host device," "client," "end user device," "endpoint device," and "user" may be used interchangeably as appropriate without departing from the scope of this disclosure. Moreover, while each end user device may be described in terms of being used by one user, this disclosure contemplates that many users may use one computer or that one user may use multiple computers, among other examples.

A host system (e.g., 105) can be further configured to host one or more virtual machines. For instance, a host device may include a virtual machine monitor (VMM) and/or hypervisor, which may be utilized to host virtual machines on the host device. A host device may additional include or set aside encrypted or otherwise secured memory to facilitate secured enclaves, including secured enclaves to be hosted on or in connection with one or more virtual machines hosted on the host system (e.g., 105), among other examples.

Figure 2A:
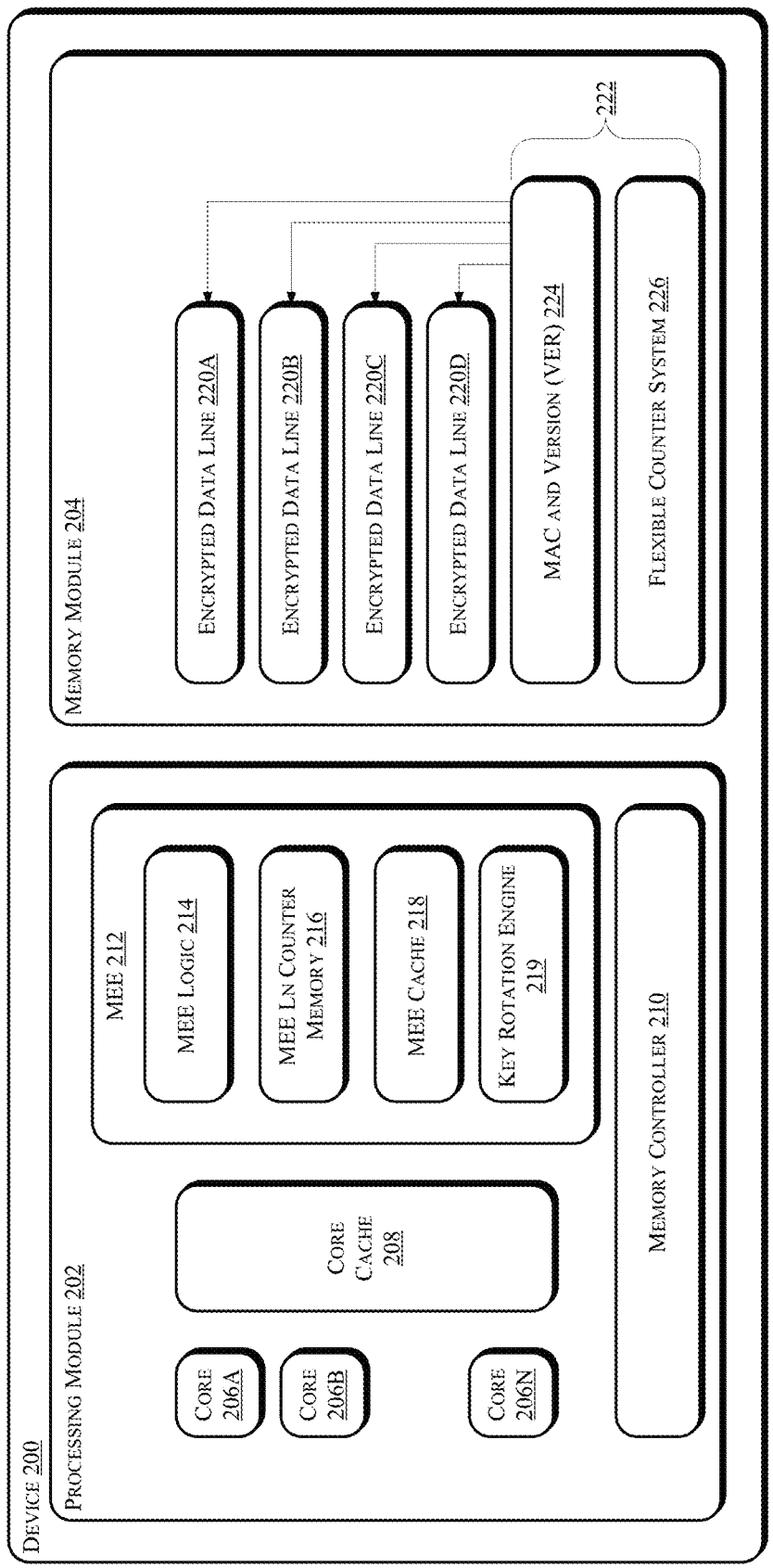
FIG. 2A is a schematic illustration of an exemplary electronic device in accordance with some embodiments.

FIG. 2A illustrates an example device 200 in accordance with at least one embodiment of the present disclosure. Initially, in describing various embodiments consistent with the present disclosure reference may be made to technologies such as Software Guard Extensions (SGX) developed by the Intel Corporation, the components that may make up SGX and the manner in which SGX may operate. SGX has been employed herein to provide a readily comprehensible perspective for understanding the various disclosed embodiments and is not intended to limit implementations to only employing SGX. Moreover, as referenced herein "memory protection" may generally comprise protecting the confidentiality of data via encryption, integrity protection and/or replay protection. Integrity protection may defend against attacks wherein, for example, an attacker may modify encrypted data in the memory module prior to decryption. Replay protection may prevent attacks wherein, for example, an attacker causes a decryption operation to be repeated to gain unauthorized access to protected data.

An example configuration for device 200 is disclosed in FIG. 2A. Examples of device 200 may include, but are not limited to, a mobile communication device such as a cellular handset or a smartphone based on the Android™ OS from the Google Corporation, iOS™ or Mac OS™ from the Apple Corporation, Windows™ OS from the Microsoft Corporation, Tizen™ OS from the Linux Foundation, Firefox™ OS from the Mozilla Project, Blackberry™ OS from the Blackberry Corporation, Palm™ OS from the Hewlett-Packard Corporation, Symbian™ OS from the Symbian Foundation, etc., a mobile computing device such as a tablet computer like an iPad™ from the Apple Corporation, Surface™ from the Microsoft Corporation, Galaxy Tab™ from the Samsung Corporation, Kindle™ from the Amazon Corporation, etc., an Ultrabook™ including a low-power chipset from the Intel Corporation, a netbook, a notebook, a laptop, a palmtop, etc., a typically stationary computing device such as a desktop computer, a server, a smart television, small form factor computing solutions (e.g., for space-limited applications, TV set-top boxes, etc.) like the Next Unit of Computing (NUC) platform from the Intel Corporation, etc.

Example device 200 may comprise at least processing module 202 and memory module 204. In general, processing module 202 may receive data to process from memory module 204 and may return processed data to memory module 204. In at least one embodiment, the data in memory module 204 may be protected. In one example implementation, device 200 may utilize SGX to protect at least a portion of memory module 204. SGX may provide a secure, hardware-encrypted computation and storage area within system memory, the contents of which cannot be deciphered by privileged code or even through applying hardware probes to memory bus. When memory module 204 is protected by SGX it is impossible for intruders to read the contents of the secure area. Protected data cannot be observed outside of SGX, and thus, is inaccessible outside of SGX. In particular, the identity of programs (e.g., based on cryptographic hash measurements of each program's contents) may be signed and stored inside each program. When the programs are then loaded, processing module 202 may verify that a current measurement of the program is identical to a measurement previously embedded inside the program. The signature used to sign the embedded measurement is also verifiable because processing module 202 may be provided with a public key used to verify the signature at program load time. Malware cannot tamper with a protected program because its measurement would also be altered. Malware also cannot spoof the signature because the signing key is secure with the program's author. The elements that will be described below with respect to processing module 202 and memory module 204 may be used to implement security technology like SGX in device 200. However, consistent with the present disclosure, other security technologies existing now or developed in the future may also be used.

As illustrated in FIG. 2A, processing module 202 may comprise, for example, at least one processing core 206 (e.g., core 206A, core 206B . . . core 206*n*, collectively, "cores 206A . . . n"), core cache 208, memory controller 210 and MEE 212. Cores 206A . . . n may perform various data processing operations that may utilize data stored in core cache 208. As referenced herein, a "cache" may comprise local volatile memory to hold data that may be utilized during a data processing operation. In at least one embodiment, Core cache 208 may comprise a plurality of separate memory areas organized in levels with the outmost level (e.g., from which data may be transmitted to, and received from, MEE logic 214) being the last level cache (LLC). Core cache 208 may help to expedite data processing by avoiding having to repeatedly retrieve data that may be used more than once during a data processing operation from memory module 204. Memory controller 210 may control how processing module 202 may access memory module 204, including reading data from memory module 204 and writing data to memory module 204.

MEE 212 may comprise, for example, MEE logic 214 to perform memory protection operations, MEE Ln counter memory 216 to hold top-level counter data and MEE cache 218 to hold security metadata 226 at least during memory protection operations. In general, security metadata 226 may comprise data utilized in support of memory protection operations. For example, consistent with the present disclosure core 206A may perform data processing operations requiring data secured by a protection system such as SGX. Protected data such as encrypted data line 220A, encrypted data line 220B, encrypted data line 220C and encrypted data line 220D (collectively, "encrypted data lines 220A . . . D") in memory module 204 may be retrieved by MEE logic 214 and decrypted prior to being provided to core 206A. FIG. 2 shows only four encrypted data lines 220A . . . D corresponding to VER and MAC data in a single data line 228, however, the actual number of encrypted data lines 220A . . . D in memory module 204 may depend on a variety of factors such as, for example, the size of the MEE-protected region in memory module 204. In at least one example implementation, each data line may comprise 64 B (Bytes) of data that may be stored in a protected region of memory module 204 comprising 128 MB. Likewise, data generated by core 206A that may be sensitive, confidential, etc. may be provided to MEE logic 214 for encryption prior to storage in memory module 204. In this manner, an attacker monitoring data being exchanged between processing module 202 and memory module 204 may be prevented from determining the content of certain data that may be sensitive, confidential, etc.

In at least one embodiment, MEE logic 214 may employ counter-mode encryption to decrypt encrypted data (e.g., encrypted data lines 220A . . . D) required by cores 206A . . . n, or to encrypt plaintext data generated by cores 206A . . . n, using security metadata 222 stored at least partially in memory module 204. Counter-mode encryption operates by performing an exclusive OR (XOR) between the data to be encrypted or decrypted and a "cryptopad" generated based on a seed. For example:

$$\text{Cryptopad} = \text{AES}_k(\text{Seed}) \quad (1)$$

$$\text{Encryption} = \text{Plaintext XOR Cryptopad} \quad (2)$$

Wherein AES is an encryption operation based on the Advanced Encryption Standard and k is the key and the size of the key indicates the number of repetitions of transformation rounds that convert the seed into the cryptopad. The protection offered by counter-mode encryption relies mostly on the uniqueness of the seed. This allows data-related operations to proceed independently of cryptographic operations related to the seed, which may improve the overall memory protection performance in that these operations may occur in parallel. Counter-mode encryption requires that the seed be unique spatially and temporarily. Spatial uniqueness may be derived from the address in memory module 204 to which data may be stored (e.g., encrypted data line 220A) as a component of the seed. Consistent with the present disclosure, temporal uniqueness may be achieved using counter values generated by flexible counter system 226. For example, counters in each data line of flexible counter system 226 may be associated with lower level data lines in a hierarchical counter tree structure, and ultimately with a memory location in memory module 204. Counters in each data line of the tree structure may be incremented prior to storing data in the corresponding memory location. The lowest level counter value corresponding to a data line (e.g., encrypted data line 220A) that is being written to memory module 204 may be deemed a "version" (VER) of the data. The values of the counters in the higher levels of the tree structure may be usable to verify the integrity of the VER data line when encrypted data line 220A is later loaded from memory module 204 into processing module 202. Memory authentication code (MAC)/VER data 224 and flexible counter system 226 are generally referenced herein as security metadata 222. During encryption and/or decryption operations, MEE logic 214 may cause at least some of security metadata 222 to be loaded into MEE cache 218 for use in cryptographic operations (e.g., along with data stored in MEE $L_N$ counter memory 214).

Figure 2B:
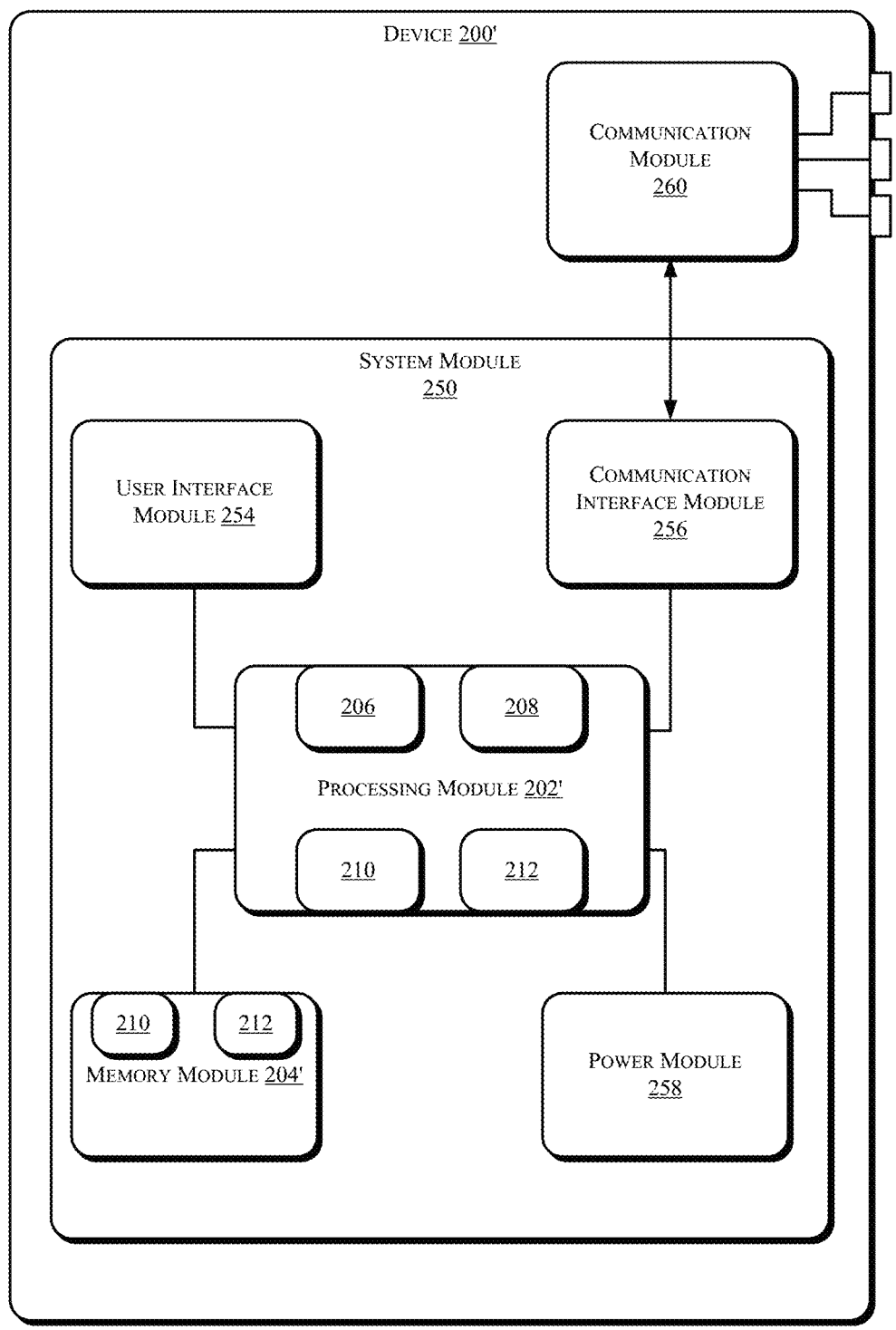
FIG. 2B is a schematic illustration of a computing environment in accordance with some embodiments.

FIG. 2B illustrates an example configuration for a device 200' usable in accordance with at least one embodiment of the present disclosure. The inclusion of an apostrophe after an item number (e.g., 200') in the present disclosure may indicate that an example embodiment of the particular item is being illustrated. For example, device 200' may be capable of performing any or all of the activities disclosed in FIG. 2A. However, device 100' is presented herein only as an example of an apparatus usable in embodiments consistent with the present disclosure and is not intended to limit any of the various embodiments to any particular manner of implementation.

Device 200' may comprise, for example, system module 250 to manage operation of the device. System module 250 may include, for example, processing module 202', memory module 204', power module 258, user interface module 254 and communication interface module 256. Device 200' may further include communication module 308. While communication module 308 is illustrated as separate from system module 250, the example configuration shown in FIG. 2A has been provided merely for the sake of explanation. Some or all of the functionality associated with communication module 308 may also be incorporated into system module 250.

In device 200', processing module 202' may comprise one or more processors situated in separate components, or alternatively one or more cores 206A . . . n in a single component (e.g., in a System-on-a-Chip (SoC) configuration), along with processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, Core M-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202' may interact with other system components that may be operating at different speeds, on different buses, etc. in device 200'. Moreover, some or all of the functionality commonly associated with the support circuitry may also be included in the same physical package as the processor (e.g., such as in the Sandy Bridge family of processors available from the Intel Corporation). As shown in FIG. 2, processing module 202' may comprise at least cores 206A . . . n, core cache 108, memory controller 210, and MEE 212.

Processing module 202' may be configured to execute various instructions in device 200'. Instructions may include program code configured to cause processing module 202' to perform activities related to reading data, writing data, processing data, formulating data, converting data, transforming data, etc. Information (e.g., instructions, data, etc.) may be stored in memory module 104'. Memory module 104' may comprise random access memory (RAM) and/or read-only memory (ROM) in a fixed or removable format. RAM may include volatile memory configured to hold information during the operation of device 200' such as, for example, static RAM (SRAM) or Dynamic RAM (DRAM). ROM may include non-volatile (NV) memory modules configured based on BIOS, UEFI, etc. to provide instructions when device 200' is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc. As shown in FIG. 3, memory module 204' may comprise at least encrypted data lines 220A . . . D and security metadata 222 (e.g., MAC and VER data 224 and flexible counter system 226).

Power module 258 may include internal power sources (e.g., a battery, fuel cell, etc.) and/or external power sources (e.g., electromechanical or solar generator, power grid, external fuel cell, etc.), and related circuitry configured to supply device 100' with the power needed to operate. User interface module 304 may include hardware and/or software to allow users to interact with device 200' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface module 254 may be incorporated within device 200' and/or may be coupled to device 200' via a wired or wireless communication medium. User interface module 254 may be optional in certain circumstances such as, for example, a situation wherein device 200' is a server (e.g., rack server, blade server, etc.) that does not include user interface module 304, and instead relies on another device (e.g., a management terminal) for user interface functionality.

Communication interface module 256 may be configured to manage packet routing and other control functions for communication module 260, which may include resources configured to support wired and/or wireless communications. In some instances, device 200' may comprise more than one communication module 260 (e.g., including separate physical interface modules for wired protocols and/or wireless radios) managed by a centralized communication interface module 256. Wired communications may include serial and parallel wired mediums such as, for example, Ethernet, USB, Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, etc.), long range wireless mediums (e.g., cellular wide-area radio communication technology, satellite-based communications, etc.), electronic communications via sound waves, etc. In one embodiment, communication interface module 306 may be configured to prevent wireless communications that are active in communication module 308 from interfering with each other. In performing this function, communication interface module 306 may schedule activities for communication module 308 based on, for example, the relative priority of messages awaiting transmission. While the embodiment disclosed in FIG. 3 illustrates communication interface module 206 being separate from communication module 260, it may also be possible for the functionality of communication interface module 256 and communication module 208 to be incorporated into the same module.

As introduced above in the discussion of the example of FIG. 1A, cache lines of data in pages of memory within memory module 204 may be allocated for use in connection with secure enclaves implemented using a computing system. For instance, turning to FIG. 1B, an application enclave can be provided on an application (e.g., application 152) to protect all or a portion of a given application and allow the application (and its security features) to be attested to. For instance, a service provider 170, such as a backend service or web service, may prefer or require that clients, with which it interfaces, possess certain security features or guarantees, such that the service provider 170 can verify that it is transacting with who the client says it is. For instance, malware (e.g., 156) can sometimes be constructed to spoof the identity of a user or an application in an attempt to extract sensitive data from, infect, or otherwise behave maliciously in a transaction with the service provider 170. Signed attestation (or simply "attestation") can allow an application (e.g., application 152) to verify that it is a legitimate instance of the application (i.e., and not malware). Other applications 152 that are not equipped with a secure application enclave may be legitimate, but may not attest to the service provider 170, leaving the service provider 170 in doubt, to some degree, of the application's authenticity and trustworthiness. Further, host system platforms (e.g., 150 can be emulated (e.g., by emulator 160) to attempt to transact falsely with the service provider 170. Attestation through a secure enclave can guard against such insecure, malicious, and faulty transactions.

As a general matter, a computing platform equipped with logic to implement secured memory regions for use by secure enclaves (and other uses) may allow software to run in a trustworthy manner and handle secret data. This can protect against malicious actors, including those which have full control of the system, and the software running on it at any privilege level, and can read or modify the contents of the DRAM (including copy-and-replay). For instance, the computing platform may define a trust region that only includes the CPU internals. A set of CPU instructions may be provided with the platform, which are supported by a hardware-based access control mechanism to provide for loading application code and data from memory, while incrementally locking it in a dedicated secured memory (e.g., DRAM) region, and generating its cryptographic measurement. After the code is loaded, it can run in a special mode as a secure enclave, remaining isolated from all other processes on the system (e.g., as governed by the access control mechanism). Accordingly, such computing platforms may enable a secret owner to provision a secret to a trustworthy enclave. The trusted enclave can prove to an off-platform entity (or to another enclave on the same platform) that it is running on a genuine processor including such security functionality and that the value it reports for its cryptographically measured identity is trustworthy.

In some implementations, attestation can be provided on the basis of a signed piece of data, or "quote," that is signed using an attestation key securely provisioned on the platform or virtual machine hosting the application. For instance, an application 152 may be provided that is provided with a secure application enclave for securely maintaining data and/or securely communicating in transactions with a service provider 170. Additional secured enclaves can be provided (i.e., separate from the secure application enclave) to measure or assess the application and its enclave, sign the measurement (included in the quote), and assist in the provisioning one or more of the enclaves with keys for use in signing the quote and establishing secured communication channels between enclaves or between an enclave and an outside service or system (e.g., 170). For instance, one or more provisioning enclaves can be provided to interface with a corresponding provisioning system to obtain attestation keys for use by a quoting enclave and/or application enclave. One or more quoting enclaves can be provided to reliably measure or assess an application and/or the corresponding application enclave and sign the measurement with the attestation key obtained by the provisioning enclave through the corresponding provisioning service system, among other examples.

Through attestation, a trusted channel may be established with an identified enclave to provision a secret onto the enclave. For handling provisioned secrets, a secured computing platform (such as illustrated in FIG. 2) may be provided with additional instructions that allow an enclave to encrypt any information with a secret key that is unique to the platform and to its identity. Thus, an enclave can safely store (and retrieve) secrets on untrusted locations (e.g., a disk). As introduced above, protected memory regions may be provided to enable the secure handling of secrets. To trust an enclave's cryptographic identity, its intended execution flow, and the attestation protocol, the corresponding pages of memory allocated to and used by the enclave are secured to be tamper resistant and replay protected. A memory encryption engine (MEE) (e.g., 212), which delivers the protection for a protected memory region (e.g., 204). In some implementations, the MEE may implement security through an integrity tree, the cryptographic primitives that realize the encryption, a Message Authentication Code (MAC), and an anti-replay mechanism.

Having described various aspects of computing environments, attention will now be turned to more particular structures and techniques Counter Systems for Memory Protection FIG. 3 illustrates an example structure for a counter system in accordance with at least one embodiment of the present disclosure. As previously discussed, temporal uniqueness may be based on a chain of counters each associated with a hierarchy of data lines. In at least one embodiment, the lowest level counter may then be associated with a location (e.g., address) in memory module 104 to which an encrypted cache line will be written, wherein the counters are incremented on each write to the memory location. The counters may be used to formulate a VER for the data line for providing replay protection. Security is maintained while the value of the counter can continue to increase. Thus, it is important for the counter to be large enough to prevent an overflow, wherein the counter reaches its maximum value, in its foreseeable lifetime. Once the counter overflows, temporal uniqueness no longer exists and an attacker may "replay" encrypted data lines 120A . . . D on the same address. For example, since the seed is no longer changing based on the temporal uniqueness provided by the counter, security metadata 122 from a prior encryption operation may be used to replay (e.g., decrypt) encrypted data lines 120A . . . D.

An example counter structure is illustrated at 300 in FIG. 3. Example counter structure 300 may comprise a hierarchy of data lines including, for example, L3 302, L2 306, L1 314, L0 322 and VER 330. L3 data line 302 may comprise top-level counters (TLC) stored in MEE Ln counter memory 116 within processing module 102, and thus, may be guaranteed to be safe. L3 data line 302 may comprise a plurality of counters that each correspond to a lower-level data line (e.g., at the L2 level). Each L3 counters may "protect" an L2 data lines from being modified in memory module 104 because L2 eMAC 310 cannot be recalculated without knowing the value of L3 counter 304. Likewise data line L2 306 may comprise a plurality of counters that each protect a lower level data line (e.g., at the L1 level) as in the instance of L3 data line 302, L1 data line 314 may comprise a plurality of counters that each protect an L0 data line, and L0 data line 322 may comprise a plurality of counters that each correspond to a VER line. Each of the VER counters may correspond to a location in memory module 104 in which encrypted data 120A . . . D is stored. The size of each counter may be determined in bits such as, for example, 56 b. Data line L2 306 may also include embedded MAC (eMAC) 310. In at least one embodiment, eMAC 310 may be embedded by distributing portions of eMAC 310 between the plurality of counters as shown at 312. Likewise, L1 data line 314 may further comprise eMAC 318 distributed between the plurality of counters as shown at 320, L0 data line 322 may further comprise eMAC 326 distributed between the plurality of counters as shown at 328, and VER data line 330 may comprise eMAC 334 distributed between the plurality of counters as shown at 336. While eMACs 310, 318, 326 and 334 are illustrated at 312, 320, 328 and 336 as being distributed between the plurality of counters in data lines 306, 314, 322 and 330, respectively, this is merely an example of how eMACs may be embedded. Other configurations (e.g., contiguously at the beginning, middle or end of the data line) may be possible consistent with the present disclosure.

In an example of operation, counters 304, 308, 316 and 324 may each correspond to lower-level data lines L2 306, L1 314, L0 322 and VER 330, respectively. These counters may be used formulate eMACs 310, 318, 326 and 334 for protecting these data lines. VER data line 330 includes VER 332, which may be utilized in encryption of plaintext data 342 and decryption of encrypted data line 120. For example, L2 eMAC 310 may be calculated using a cryptographic operation based on the current values of the counters in L2 data line 306 and the value of counter 304 in the immediately preceding L3 data line 302. eMAC 310 may then be distributed into L2 data line 306 as shown at 312. The cryptographic operations will be explained further in FIG. 4. These operations may then repeat for each subsequent data line. For example, L1 eMAC 318 may be calculated over the current values of the counters in L1 data line 314 in combination with the current value of counter 308, L0 eMAC 326 may be calculated over the current values of the counters in L0 data line 322 in combination with the current value of counter 316, and VER eMAC 334 may be calculated over the current values of the counters in VER data line 330 in combination with the current value of counter 332. VER 332 and address 340, corresponding to the location (e.g., address) in memory module 104 wherein encrypted data line 120A is stored, may then be used in encryption/decryption operations 338 to encrypt plaintext data 342 into encrypted data line 120A and to decrypt encrypted data line 120A into plaintext data 342.

FIG. 4 illustrates example operations for calculating an embedded memory authentication code for the counter system structure illustrated in FIG. 3 and also for a flexible counter structure in accordance with at least one embodiment of the present disclosure. While the benefits of large counters are apparent (e.g., that overflow may be prevented in the foreseeable lifetime of device 100), making the counters too large may cause different problems. The efficiency of the counter organization is very important in MEE implementation as counter structures such as illustrated in example 300 may result in 25% space overheads. This works well when the protected memory size is 128 MB as may be typical in existing implementations. However, future implementations may be extended to servers that may include large footprint applications. For example, given an implementation with 192 gigabytes (GB) of protected memory in memory module 104, 48 GB of memory module 104 would have to be reserved just for security metadata 122. Sacrificing 48 GB for security metadata 122 is impractical, and may make implementing protective systems such as SGX on large-scale platforms prohibitive. Furthermore, some operating systems (e.g., Microsoft Windows) have placed requirements on how much memory may be commandeered from the OS. If more memory is reserved than what is allowed by the OS manufacturer, obtaining hardware certification from, for example, Windows Hardware Quality Labs (WHQL) may be improbable.

Consistent with the present disclosure, the memory space required for security metadata 122 may be substantially reduced (e.g., by 50%). Better performance may be realized due to, for example, the ability to incorporate more counters with the same amount of memory accesses. In addition to the efficient counter organization, minimizing the impact of overflow prevention on data processing performance is also important. An adaptive mechanism may minimize storage overhead, and at the same time, ensure that reduced memory consumption does not come at the cost of increased data processing burden for device 100.

Examples 400 and 402 are illustrated in FIG. 4. Example 400 discloses how MAC 310 is calculated based on the counter structure of example 300. Moving from right to left in example cryptographic operation 404, AES 128b encryption may generate a 128 B key value (e.g., IPKey1 and IPKey0 each including 64 b) based on a 128 b AES key and another 128 b input comprising the current value of counter 306 at 56 b, a 34 b address (e.g., corresponding to a memory location where the data will be stored in memory module 104) and 38 b of zero padding (0). The 128 b key resulting from AES encryption and the current values of the counters in L1 data line 314 (e.g., totaling 512 b) may then be hashed (e.g., may be combined and a value may be calculated based on the contents of combined data) to generate a 64 b MAC. In example 400, the calculated MAC may be LE eMAC 318, which may then be distributed into L1 data line 314 as shown at 320. The same process may also be used for verification when encrypted data (e.g., encrypted data line 120A) is loaded from memory module 104. A "tree walk" may be performed starting from the VER level and going up to the L3 level, wherein a new MAC may be calculated for each data line and compared to the eMAC to see if the data line has changed since it was saved. The newly calculated MAC not matching the eMAC indicates that the data line was changed in memory module 104, possibly due to an attack. Discontinuity determined during the tree walk may trigger a security exception in device 100 to protect the device from being compromised.

Example 402 shows a modified counter structure consistent with the present disclosure. In particular, the counters in L1 data line 314' have been reduced in size from L1 data line 314, and overflow counter 405 has been added. Counter 316' is reduced to 24 b in example 402. This means that L1 data line 314' may comprise twice as many counters as L1 data line 314, and thus, may account for twice as many locations in memory module 104 to store encrypted data lines 120A . . . D. However, since the counters in L1 data line 314' are less than half the size of the counters in L1 data line 314, they will overflow twice as quickly (depending on the activity for the memory location with which they are associated). Overflow counter 314' may account for this situation by being combined with any counter that is in an overflow state. For example, if counter 306' in example 402 is in an overflow state, then when cryptographic operation 404' is performed the input to AES 128 may comprise a 64 b current value from overflow counter 406, a 24 b current value from counter 308' (the counter from the previous level), a 34 b address and 6 b of zero-padding. In at least one embodiment, counters that overflow (e.g., counter 308') may reset and start counting again after it utilizes overflow counter 406.

This means that overflow counter 406 may only increment once for each time a counter in L1 data line 314' overflows.

Moreover, by packing more counters into each counter line (e.g., L1 data line 314') MEE 112 may operate with a reduced-height replay-protection tree given the same sized on-chip TLC. For example, existing implementations of protection systems like SGX may employ a five level replay protection tree including version (Version, L0, L1, L2 and L3). Using 24 bit counters and the various mechanisms disclosed herein, MEE 112 may be able to reduce the replay tree to have 4 levels (Version, L0, L1 and L2 stored in processing module 112). This reduction in levels may enable MEE 112 to have to traverse fewer levels during cryptographic tree walks for encryption or decryption. It has been observed through simulation that eliminating a level of the replay tree may substantially reduce the performance impact caused by the cryptographic mechanisms of MEE 112 (e.g., by 11.8%). In addition to improved performance, the space in memory module 104 required for the counters may be reduced by 50%, which may resolves the metadata space overhead issues associated with the future usage of protection systems (e.g., SGX).

Figure 5:
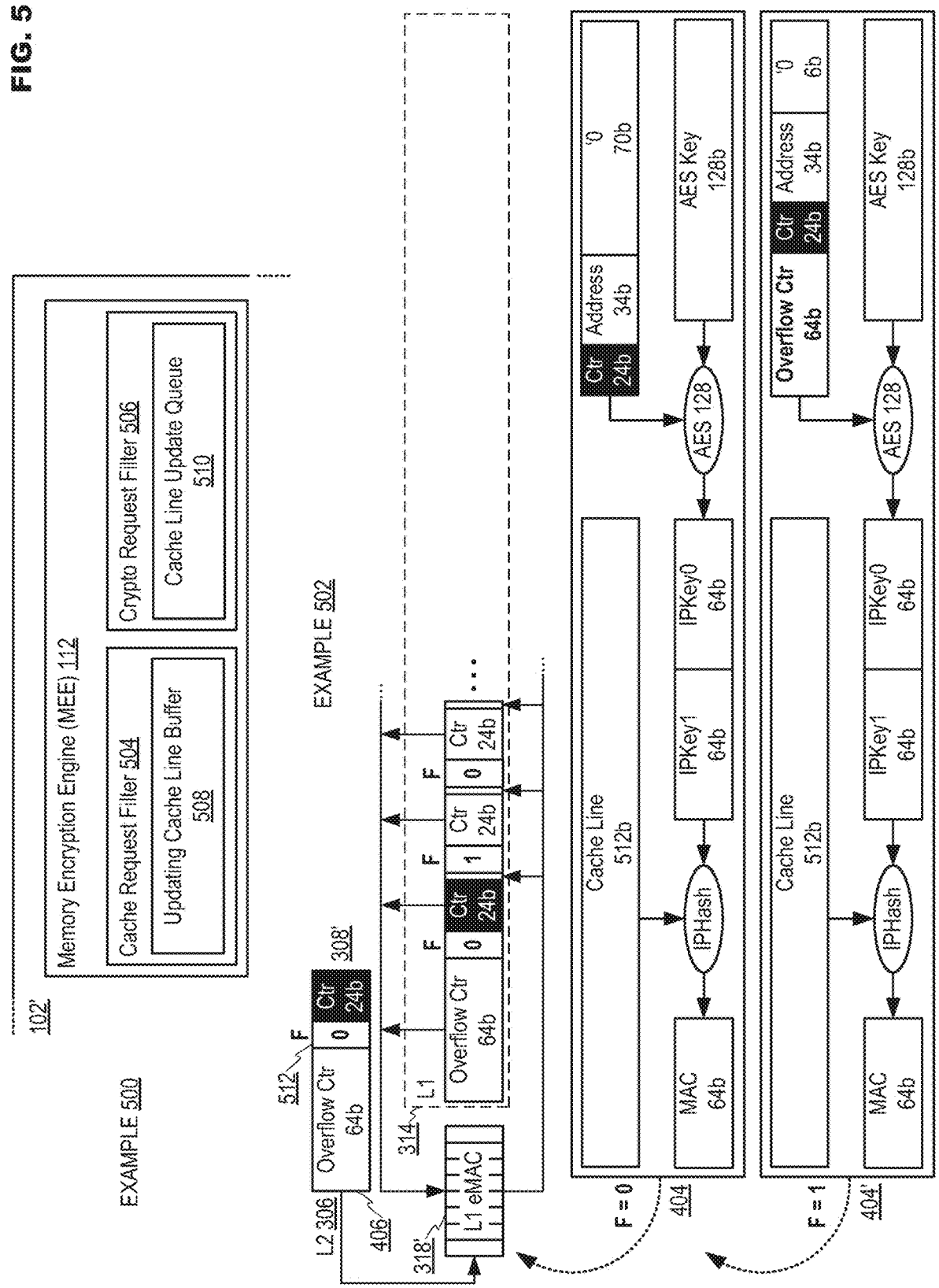
FIG. 5 illustrates an example configuration for a memory encryption engine and an example structure for a flexible counter including an overflow indication system in accordance with at least one embodiment.

FIG. 5 illustrates an example configuration for a memory encryption engine and an example structure for a flexible counter including an overflow indication system in accordance with at least one embodiment of the present disclosure. Two examples are illustrated in FIG. 5 to demonstrate architectural changes that may be implemented to support counters structures that include overflow features such as disclosed in example 402. At least one issue that may arise from the introduction of overflow counter 406 is that whenever overflow counter 406 is updated (e.g., overflow counter 406 in L2 data line 306' may be incremented when counter 308' enters the overflow state), all lower-level eMACs that rely upon the values of counters in the data line must also be updated. For example, when counter 406 increments L1 eMAC 318' must be updated along with any other L1 level data line that relies on one of the sixteen counters in L2 data line 306' (not shown) for computing their respective eMAC. As referenced herein, this type of update is termed a bulk update. To allow for efficient bulk update, MEE 112 may be modified such as set forth in example 500. For example, MEE 112 may be modified to include cache request filter 504 and crypto request filter 506. For cache accesses, access to the metadata cache lines that are regenerating eMACs should be blocked because these values are in flux. The access should only be allowed once the bulk update is completed. This may be done by maintaining the address of a currently updating data line in updating cache line buffer 508 which may be, for example, a register, local memory, etc. In an example of operation, updating cache line buffer 508 may be compared with incoming data line access requests to block incoming accesses until the update of the data line is complete. For cryptographic-related accesses, we may add a simple cache line update queue 510, which may be a register or local memory that holds AES operations generated by a bulk eMAC update or data re-encryptions caused by updating overflow counter 406. Cryptographic requests may now check whether there are pending requests in cache line update queue 510 before accessing the AES logic. To prevent potential deadlocks, requests from cache line update queue 510 may have higher priority over incoming crypto requests.

Example 502 illustrates a bit-based flag system that may help to reduce the amount of cryptographic data re-processing required for bulk updates that are caused by overflow counter usage. With the introduction of overflow counter 406 into the basic counter structure, whenever overflow counter 406 is incremented in a data line it must be assumed that all of the counters in the same data line have changed due to their possible reliance on overflow counter 406, and thus, all of the eMACs based on these possibly updated counters in the data line must be recalculated. This forced assumption may result in a wasted expenditure of valuable data processing capacity as possibly only one or a few of the counters in the data line may actually be relying on overflow counter 406 when it was incremented. This effect is exacerbated by the fact that in the proposed counter structure of example 402 L2 data line 314' comprises counters that may correspond to sixteen (16) different data lines, which may be the epicenter of a ripple effect of wasted bulk eMAC re-processing. To counter this effect, in example 502, a flag "F" 512 is introduced corresponding to each counter to indicate the counters that are currently relying upon overflow counter 406. Instead of concatenating overflow counter 406 with every counter in the data line unconditionally, flag 512 may provide a selective overflow counter mechanism that checks the overflow indicator 512 first. As shown in example 502, flag 512=0 it may indicate that the corresponding counter 318' has not entered into an overflow state, and thus there is no need to use overflow counter in the cryptographic operations as counter 308' itself is enough to provide temporal uniqueness. Given a 128 b AES operation, 70 b of 0-padding is utilized instead of 64-bit overflow counter 406. If flag 512=1, as shown at 404' overflow counter 406 may be employed in the cryptographic operation to provide temporal uniqueness for the overflowed counter 308'.

The benefit of selectively using the overflow counter in cryptographic seed may include a reduction in data processing overhead. For example, when an overflow happens and bulk eMAC updates occur or data line re-encryption and re-calculation of MAC happen, cache line counters with F=0 do not need to update their eMAC or re-encrypt data as overflow counter 406 was not utilized in computing subsequent eMACs based on the counter. For example, if only one counter in a data line was using overflow counter 406 when it is incremented (e.g., counter 308 in data line L2 306), then only one flag (e.g., F 512) would be set to "1" during bulk updates, and only the eMAC for the L1 data line that relies on counter 308' for temporal uniqueness (e.g. L1 data line 314) would require reformulation to account for overflow counter 406 being incremented. This may greatly reduce the impact on performance for overflow counter-related bulk updates.

Figure 6:
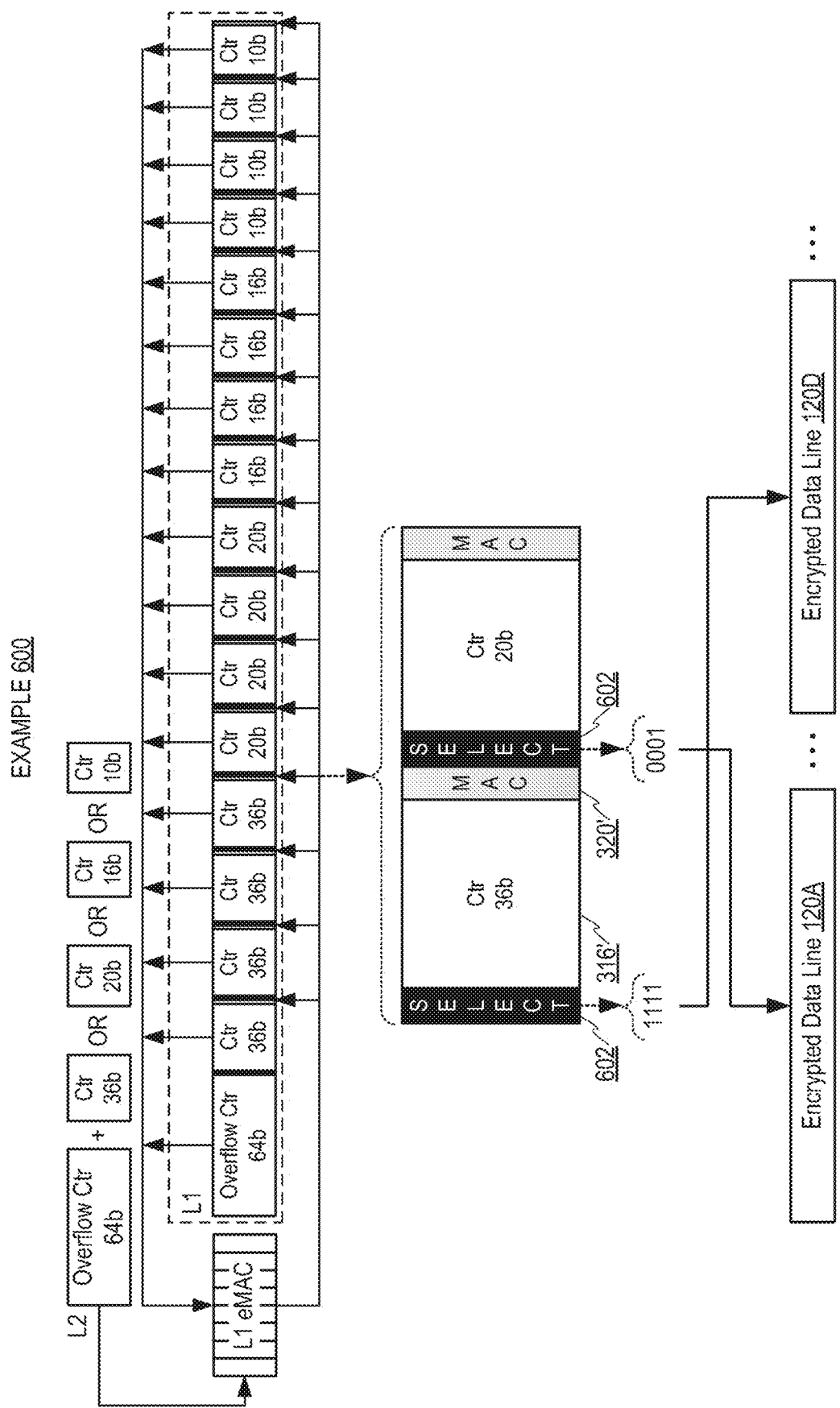
FIG. 6 illustrates an example flexible counter structure comprising selection functionality in accordance with at least one embodiment.

FIG. 6 illustrates an example flexible counter structure comprising selection functionality in accordance with at least one embodiment of the present disclosure. Although the probability of counter overflows may be low even with reduced-size counters such as illustrated in example 402, each overflow may degrade performance as it causes overflow counter 406 to increment, and as a result, bulk eMAC updates may be triggered (e.g., and/or multiple data re-encryption along with MAC updates if the overflow happens at VER level). This overflow becomes more problematic in SoC products without a large LLC as the off-chip accesses tend to have a locality. With the locality in the data traffic pattern, some data blocks (e.g., "hot" data blocks) may be accessed more frequently than others, which may cause a corresponding counter to overflow much sooner than expected (even if the average counter value across the data line remains low). To avoid unexpected counter overflows and performance degradation caused by the hot blocks, an adaptive counter mapping system may be introduced to manage counter mappings between associated data block in a way that may reduce overflows. With the adaptive mapping, counter sizes are not equal any more. Instead, some counters are larger than others. Example 600 shows one possible arrangement of counter sizes. Here, instead of sixteen (16) 24-bit counters depicted in example 402, each metadata cache line holds four (4) 36-bit counters, four (4) 20-bit counters, four (4) 16-bit counters and four (4) 10-bit counters. The counter arrangement illustrated in FIG. 6 is an example of how counters may be arranged for explanation purposes, and is not intended to limit the various embodiments disclosed herein to any particular manner of implementation.

In addition to the various sized counters shown in example 600, each of the counters may be augmented with selector 602 (e.g., 4-bit) that may point any data cache line in the lower level. The linkage between counters and an associated data cache line may be set dynamically based on the frequency of the counter update. This is demonstrated in example 600 wherein the previous level L2 counter may comprise the overflow counter concatenated with any of the four sizes of counter. Example 600 shows an example wherein two counters with different sizes point to two different encrypted data lines (e.g., stored in particular locations in memory module 104). Here, encrypted data line 120D is more frequently accessed, and thus, the larger counter (36 bit counter 316') is assigned, while encrypted data line 120A is assigned to the smaller (20 bit) counter as it is updated less frequently. Assigning the 20 b counter to encrypted data line 120A may help to prevent the 20 b counter from overflowing too quickly (or at all).

In an example of operation, selectors 602 may be initialized from 0 to n−1, where n is the number of counters in a cache line. In example 600, selectors 602 may be initialized from 0 to 15. From initialization, counter 0, 1, 2 . . . may point to cache line 0, 1, 2 . . . . This mapping may be identical to the mapping without the adaptive counter mapping. As the system operates, data blocks may be written to, and thus, counters are being incremented. On each counter update, the counter value may be checked as to whether it is close to overflow. One possible way to verify the counter status is to set a threshold that indicates when the counter is getting close to entering the overflow state. For example, if the counter value plus the threshold exceeds the maximum value of the counter, then remapping of the counter may be necessary. If a counter is determined to be close to overflow (e.g., based on the threshold value) adaptive mapping may promote the data line to a larger counter. Promotion may include, for example, searching counters with the next larger size to find the next-larger sized counter with the smallest value. For example, if the value of a 10-bit counter is at or over the threshold value, a search may be performed to find the 16-bit counter with the smallest value. If the smallest value of the next-larger sized counter is determined to be less that the counter value about to overflow, the two counters may be swapped. This swap may include, for example, both counter values and selector pointers. From the above operations, more frequently updated encrypted data lines 120A . . . D may be promoted to larger-sized counters and less-frequently updated encrypted data lines 120A . . . D may gradually gravitate to smaller-sized counters, allowing the system to allocate resources based on counter size and to minimize the occurrence of counter overflows and data related processing overhead.

Figure 7:
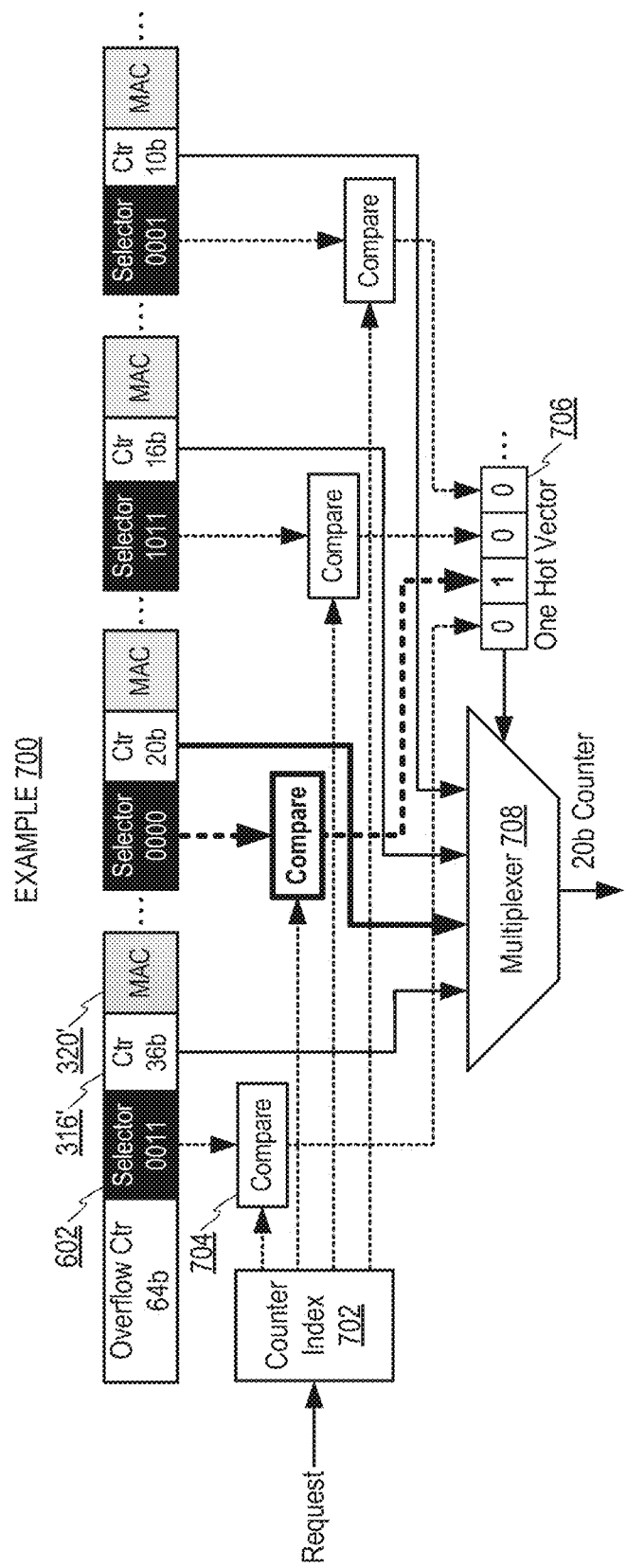
FIG. 7 illustrates an example configuration to support selection functionality in a flexible counter system in accordance with at least one embodiment.

FIG. 7 illustrates an example configuration to support selection functionality in a flexible counter system in accordance with at least one embodiment of the present disclosure. With the adaptive counter mapping, mappings between counters and corresponding lower-level data lines or memory locations in memory module 104 are no longer static. Therefore, logic may be used to configure selectors 602 to point to the correct lower-level data lines or memory locations. Example 700 shows one possible implementation of such logic. In this logic, when the request comes counter index 702 is first calculated. Counter index 702 is the index that would be used to locate the counter without the adaptive scheme, and may be easily calculated (e.g., using the address in memory module 104 of the particular encrypted data line 120 A . . . D). Counter index 702 may then be compared with the selectors 602 as illustrated at 704 to find a matching selector 602. This comparison may be parallelized with multiple comparators as the location of selectors 602 may be fixed. The results from one-hot vector 706, as there can be one and only one selector that points to the particular lower-level data line or memory location, may be used to read out the corresponding cache-line counter and provide the input to multiplexer 708. For example, in example 700 the incoming request used to be mapped to the first counter 316' if no adaptive scheme is used. However, with the new mapping logic the index may be compared with sixteen (16) selectors, and a 20-bit counter (e.g., the second counter shown in example 700) is instead mapped to the particular lower-level data line or memory location by multiplexer 708.

Figure 8:
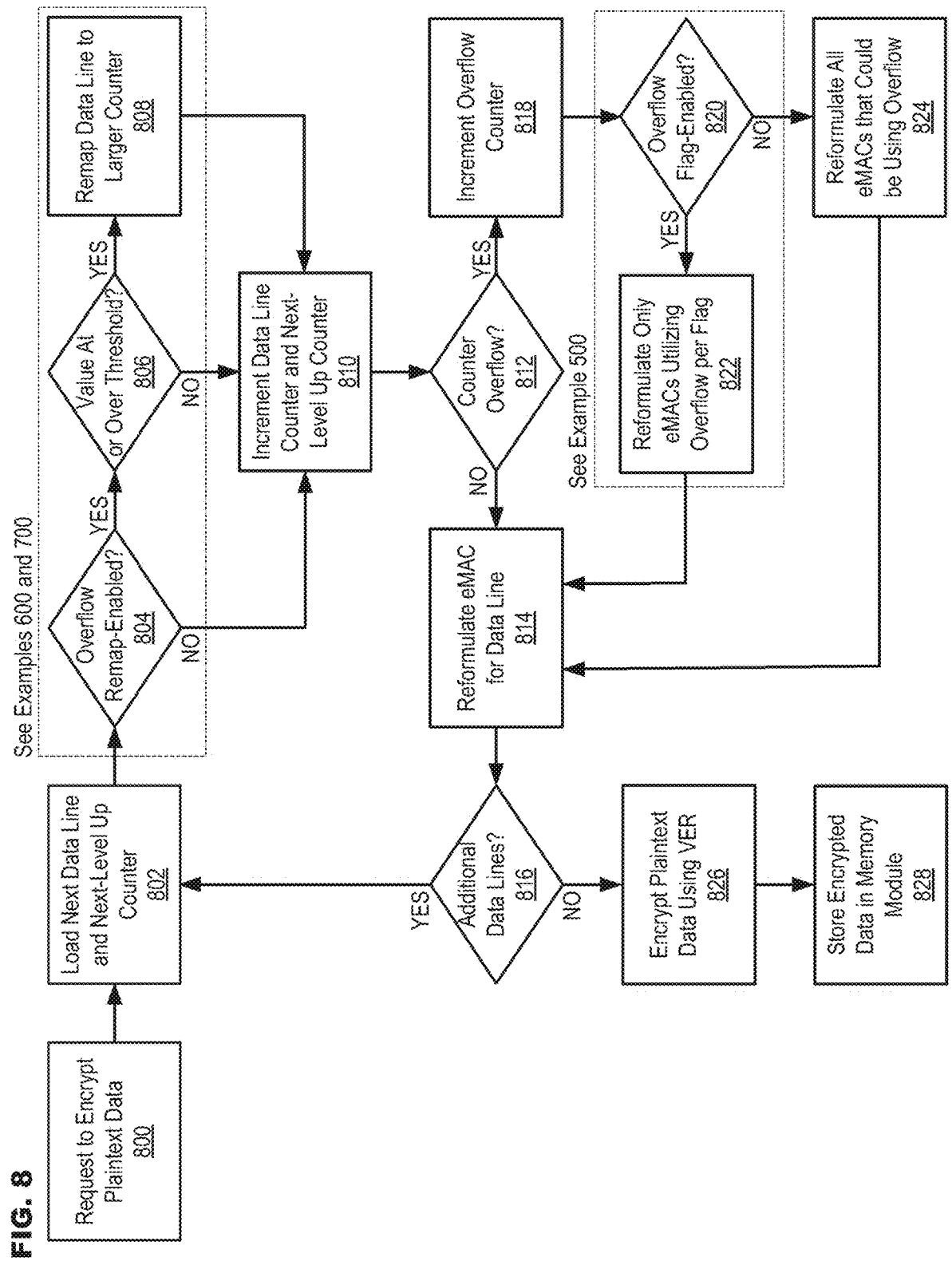
FIG. 8 illustrates example operations for memory protection in accordance with at least one embodiment.

FIG. 8 illustrates example operations for memory protection in accordance with at least one embodiment of the present disclosure. In operation 800 a request may be received to encrypt plaintext data into encrypted data. The request may be generated by, for example, a processing core in a processing module that also includes a MEE. In operation 802 the next data line may be loaded (e.g., starting with a VER data line including a VER counter corresponding to a memory location where the encrypted data will be written) and the next-level up data line (e.g., starting with the L0 line including a counter corresponding to the VER data line). Operations 804 to 808 may correspond to the example embodiment illustrated in examples 600 and 700. A determination may be made in operation 804 as to whether the counter system is overflow remap-enabled (e.g., whether counters may be remapped to help prevent counter overflow). If in operation 804 it is determined that the system is remap-enabled, then in operation 804 a further determination may be made as to whether the value of the counter in either of the loaded data lines (e.g., the VER counter in the VER data line or the counter corresponding to the VER data line in the L0 data line) is at or above the threshold value. If in operation 806 it is determined that either counter is at or over the threshold value, then in operation 808 remapping may occur (e.g., the memory location may be remapped to a larger counter in the VER data line and/or the VER data line may be remapped to a larger counter in the L0 data line). The counters may then be incremented in operation 810 following a determination in operation 804 that the counter system is not remap-enabled, a determination in operation 806 that neither of the counter values are over the threshold or following counter remapping in operation 808.

A determination may then be made in operation 812 as to whether a counter overflow has occurred. If in operation 812 it is determined that none of the relevant counters have overflowed, then in operation 814 the embedded MAC for the loaded data line (e.g., the VER data line) may be reformulated. A determination may then be made in operation 816 as to whether additional data lines need to be loaded (e.g., L1/L2 and L2/L3). A determination that additional data lines need to be loaded may be followed by a return to operation 802.

Returning to operation 812, if it is determined that at least one counter has overflowed, then in operation 818 an overflow counter in the data line where the counter has overflowed may be incremented. Operations 820 to 822 may correspond to an embodiment illustrated in example 502. A determination may then be made in operation 820 as to whether the system is overflow bit-enabled. If in operation 820 it is determined that the system is overflow bit-enabled, then in operation 822 only the eMACs for lower-level data lines that rely upon a counter that is flagged as utilizing the overflow counter need to be updated. If in operation 820 it is determined that flexible counter system is not flag-enabled, then in operation 824 all of the eMACs for data lines that rely upon counters that could possibly be utilizing the incremented overflow counter (e.g., all counters in the same data line as the incremented overflow counter) may be reformulated. Operations 822 and 824 may be followed by a return to operation 814. If in operation 816 it is determined that no further data lines need to be loaded, then in operation 826 the plaintext data may be encrypted through a cryptographic operation that utilizes as an input at least the VER corresponding to the location in the memory module where the encrypted data will be stored. The encrypted data may then be stored in the memory module in operation 828.

While FIG. 8 illustrates operations according to an embodiment, it is to be understood that not all of the operations depicted in FIG. 8 are necessary for other embodiments. Indeed, it is fully contemplated herein that in other embodiments of the present disclosure, the operations depicted in FIG. 8, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

Key Rotating Trees

Figure 9:
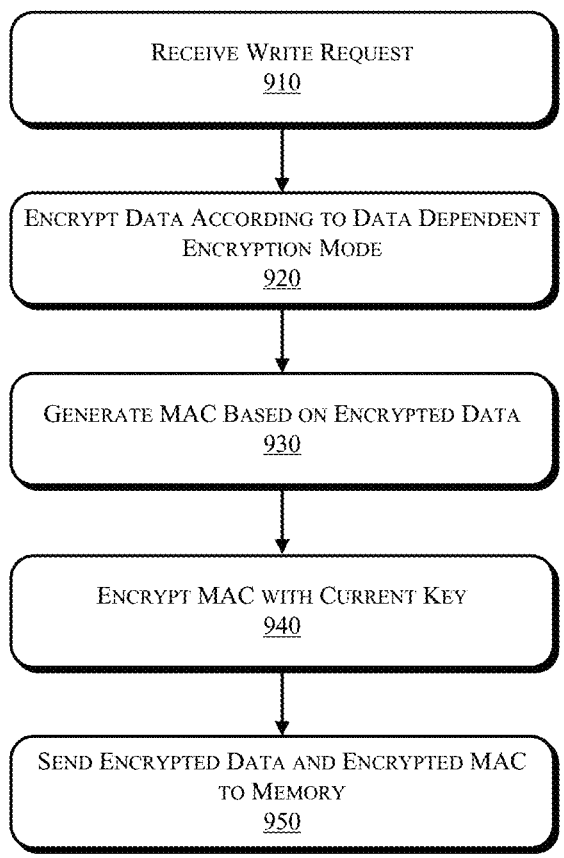
FIG. 9 is a flow diagram of a method for handling a write operation in accordance with an embodiment of the present invention.

Referring now to FIG. 9, shown is a flow diagram of a method for handling a write operation in accordance with an embodiment of the present invention. In the embodiment shown in FIG. 9, method 900 may be performed at least in part by a TMP module as described herein. Method 900 begins by receiving a write request (block 910). In an embodiment, such write request may be received responsive to execution of a write instruction to write a particular amount of data (e.g. a cache line width amount) to memory. Control next passes to block 920 where the data of the write request may be encrypted. More specifically, such encryption may be performed according to a data dependent encryption mode, such as an XTS-AES mode. Of course understand that in other embodiments different types of data dependent encryption modes may be used.

Thereafter at block 930 a MAC may be generated based on this encrypted data. In various embodiments different MAC generation processes may be used. In one particular embodiment, a 56-bit MAC value may be generated for a cache line width of data to be written to the memory. Thereafter, this MAC value itself may be encrypted (block 940). More specifically, the TMP module may store a current encryption key, which in an embodiment may take the form of a 128-bit key. This current encryption key may be used to encrypt the MAC. Thereafter at block 950 the encrypted data and the encrypted MAC both may be sent to memory. In an embodiment, these different pieces of information may be sent under control of an arbitration logic, which may arbitrate these memory write operations with other memory operations. Understand while shown at this high level in the embodiment of FIG. 9, many variations and alternatives are possible.

Figure 10:
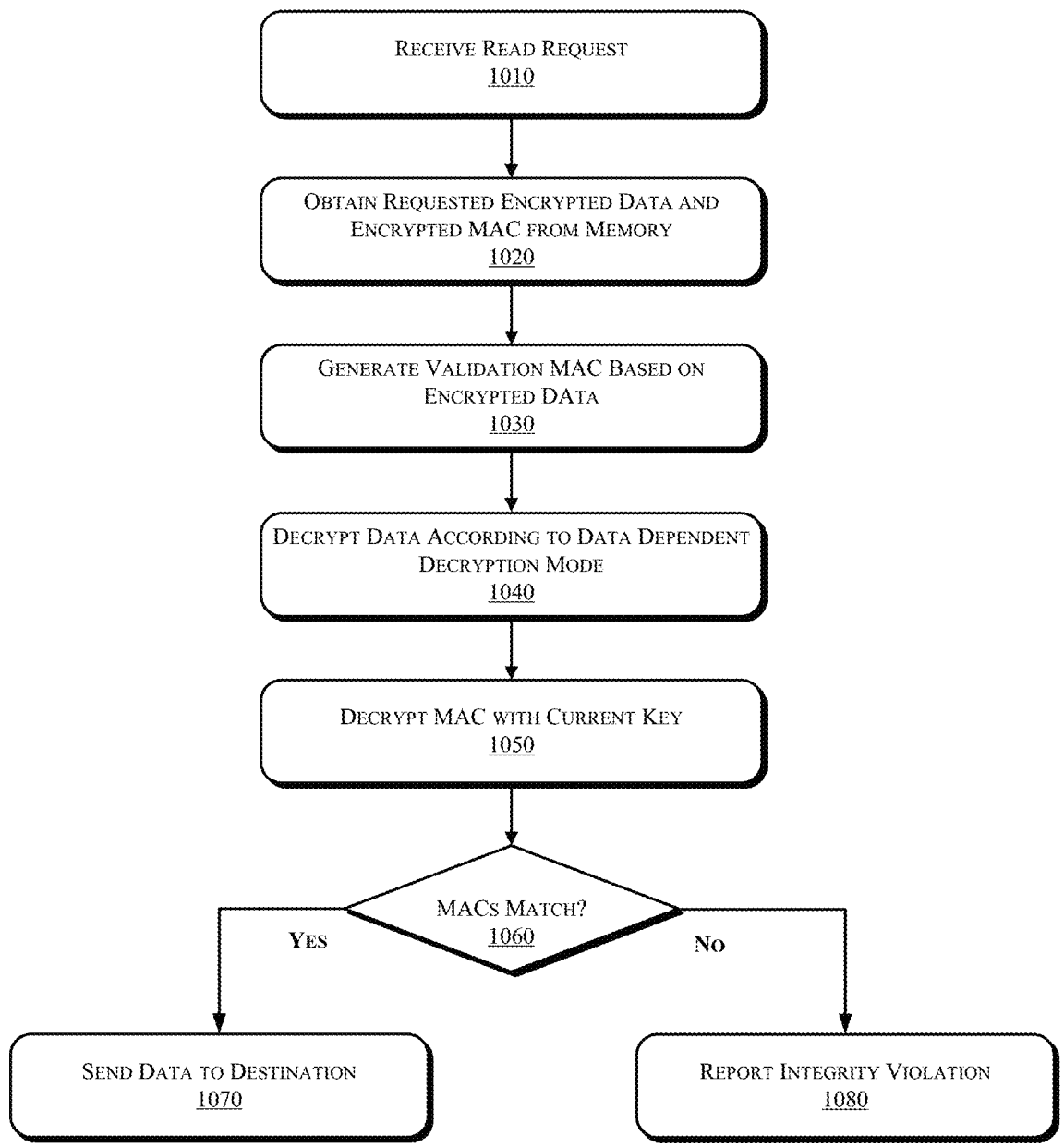
FIG. 10 is a flow diagram of a method for handling a read operation in accordance with an embodiment of the present invention.

Referring now to FIG. 10, shown is a flow diagram of a method for handling a read operation in accordance with an embodiment of the present invention. In FIG. 10, method 1000 may be performed by a TMP module responsive to a read request such as a read instruction to read a particular data portion from the memory. As seen, method 1000 begins by receiving a read request (block 1010). Responsive to this request, control passes to block 1020 where the encrypted data and a corresponding encrypted MAC may be obtained from the memory. Understand that such operations may be performed as scheduled by an arbitration logic, which arbitrates between these operations and other pending memory operations.

Thereafter various operations are performed to process the obtained information. Understand while shown with a linear flow for ease of illustration, in many embodiments various of these operations can be performed in parallel. Specifically, at block 1020 a validation MAC may be generated. More specifically, this validation MAC may be generated based on the encrypted data. In an embodiment, the same operations as described above with regard to original MAC generation may be used to generate this validation MAC. As in the above example, e.g., a 56-bit MAC value may be generated using the encrypted data and a current encryption key. At block 1040 the data itself may be decrypted according to a data dependent encryption mode. In accordance with the above discussion, in an embodiment an XTS-AES decryption may be performed. At block 1050, the received encrypted MAC itself may be decrypted, also with the current key. Understand that these operations at blocks 1030, 1040 and 1050 may be performed in parallel, in some cases.

Still with reference to FIG. 10, control next passes to diamond 1060 where it is determined whether the decrypted MAC value matches the validation MAC value. If so, the integrity of the obtained data is verified and at block 1070 the data is sent to the destination or requester (e.g., a core). Otherwise an integrity violation is reported (block 1080) and thus the data is not provided to the destination. Understand that in some cases to reduce latency upon decryption, the data may be sent to the destination and if an integrity violation is thereafter determined (at diamond 1060) the integrity violation report may be generated at block 1080 and a fault signal may be sent to the destination to prevent the earlier sent decrypted data from being committed to a state of the machine. Understand while shown at this high level in the embodiment of FIG. 10, many variations and alternatives are possible.

To provide rollback protection, MAC values may periodically be re-keyed so that a compromised MAC value recorded at an earlier time cannot later be replayed (at least outside of a re-keying time window) without raising an integrity violation. Different manners of performing re-keying may be performed in different embodiments. In some embodiments, the original data used to generate an original MAC value (and the MAC value itself) may be used to generate a new or re-keyed MAC value. In other cases, a re-keyed or new MAC value can be generated without using the associated data, potentially reducing complexity, bandwidth requirements and so forth.

In an embodiment when the TMP module is idle, it starts traversing through the range of MACs with the new key, regenerating each MAC in the process. If there is not sufficient idle time to update the MACs dynamically, an urgency-based mechanism may be activated to schedule MAC updates. In this scenario, sets of MACs that are scheduled for an update with the new key may have an increasing urgency value calculated. In turn, an arbitration logic may compare MAC update access urgency values against other memory traffic urgency values, and when their urgency values becomes high enough, the re-keying operations will be selected, even if lower priority memory traffic is stalled. While this rollback prevention mechanism is non-deterministic, it is possible to define an upper bound on how long each key window might be live before an update occurs.

Using an embodiment, latency critical high-priority bursts of memory traffic will not be impacted by replay protection overheads, as at least some of the rollback protection overhead can occur during idle periods of memory traffic. Additionally, the arbitration-based technique allows low-priority memory accesses to be impacted first, while letting high-priority traffic proceed. Note that the rollback time window can be configured differently for applications having varying security and other features, trading off performance overheads for a shorter rollback window.

Figure 11:
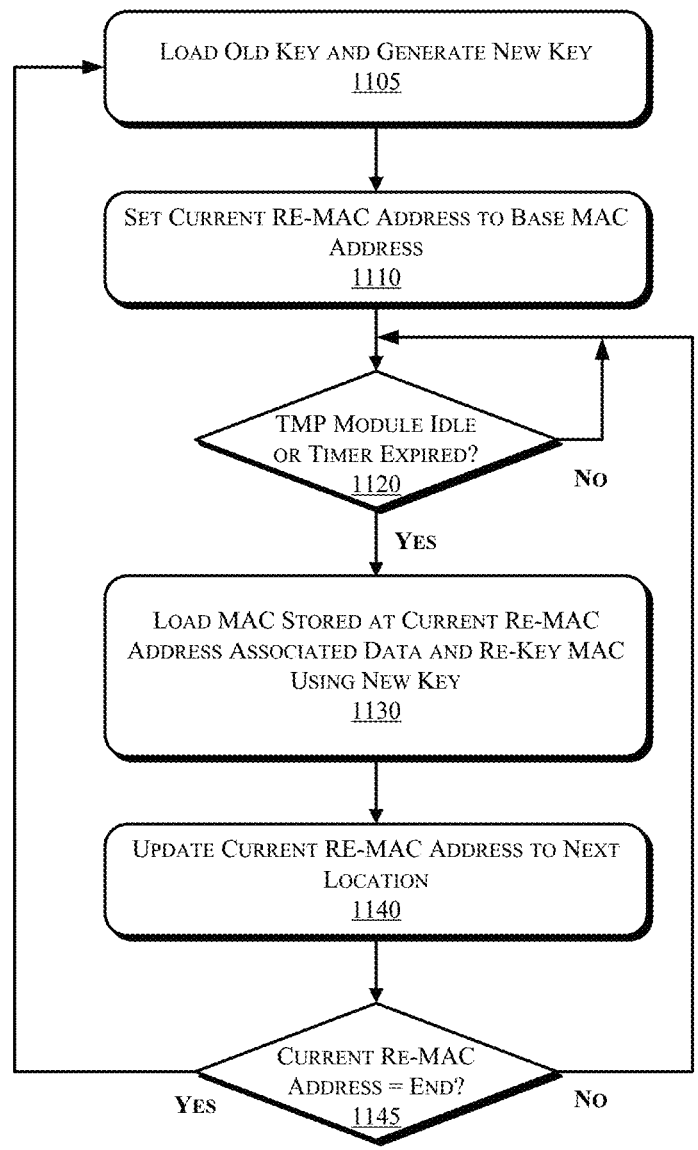
FIG. 11 is a flow diagram of a re-keying method in accordance with one embodiment of the present invention.

Referring now to FIG. 11, shown is a flow diagram of a re-keying method in accordance with one embodiment of the present invention. In the embodiment shown in FIG. 11, method 1100 may be performed to re-key MAC values using both the original MAC value and its associated data. When using a keyed MAC algorithm the associated data lines are also to be loaded and used to perform a re-keying. That is, while only 10% of memory is re-keyed, the remaining memory is also loaded to compute the new MAC (which is data dependent) with the new key. In an embodiment, a TMP module may be configured to perform method 1100. As seen, method 1100 begins by loading an old key and generating a new key (block 1105). In an embodiment, this old key may be stored in a storage of the TMP module itself. The new key may be generated according to common key generation practices, utilizing a random number generator, hardware specific seed, and some cryptographic primitives to increase the entropy of the key. Similarly, the new key also may be stored in a storage of the TMP module. At block 1110, a current re-MAC address may be set to a base MAC address. This current re-MAC address acts as a pointer to a particular location in a storage that includes the MAC values, and the base MAC address may be the address within the storage at which the first generated MAC value is stored. In the embodiment of FIG. 11, this storage may be a system memory. In other cases, the memory may be a cache memory of the processor such as a dedicated MAC storage.

In any case, control next passes to diamond 1120 to determine whether the TMP module is idle or a re-MAC timer has expired. In an embodiment, this re-MAC timer may be set at a configurable value to provide an appropriate level of rollback protection. Understand that the lower the value of this timer, the greater the protection that is afforded, while at the same time, the greater the impact on performance due to re-keying operations. In a particular embodiment, this re-MAC timer may be set on the order of approximately a given number of minutes (which may be on the order of many billions of processor clock cycles). If it is determined that this timer has expired or the TMP module is idle (and thus at an ideal time to perform re-keying), control passes to block 1130. At block 1130 a MAC stored in the current MAC address may be loaded, along with its associated data. Using this information, the MAC may be re-keyed and the resulting new MAC may be stored at the current MAC address. To perform this re-keying the MAC validation regenerates the original MAC based on the original key and data. If the regenerated MAC matches the MAC loaded from memory, then the validation is successful and a new MAC may be generated. The new MAC is generated based on the new key and data. The new MAC is then written back to memory, replacing the original MAC.

Next control passes to block 1140 where the current re-MAC address may be updated to a next location to provide a pointer to the next MAC stored in the memory. Control passes then to diamond 1145 to determine whether the current MAC address reaches the end of the region of memory holding the MAC values. If so, the current iteration of re-keying is completed and control passes back to block 1105 above, to be performed during a next re-keying iteration. Otherwise, control passes to diamond 1120 where a re-keying operation for a next MAC within the storage is performed.

Figure 12:
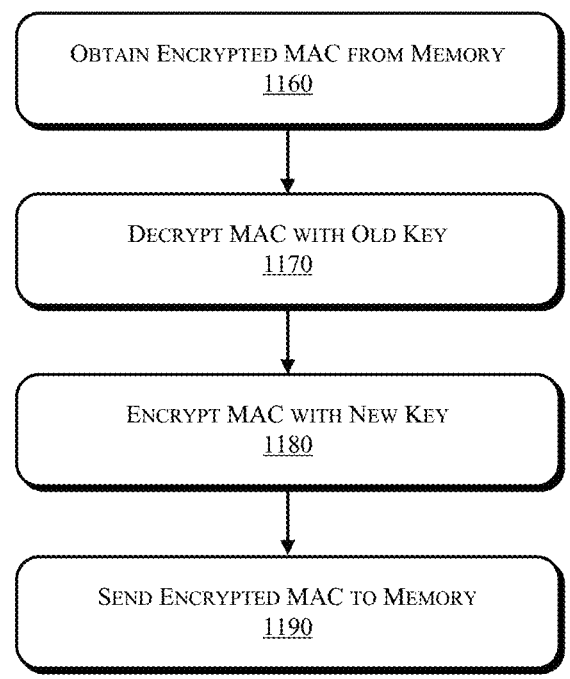
FIG. 12 is a flow diagram of a re-keying method in accordance with another embodiment of the present invention.

As discussed above the re-keying of FIG. 11 uses both the original MAC value and the associated data and thus the bandwidth of obtaining the data is incurred. In other cases, a re-keying operation may be performed without the associated data. In this example, a MAC algorithm such as a SHA or MD5 algorithm may be used. However, the final MAC is generated by encrypting this MAC value with the current MAC key. This differs from a standard keyed MAC construction (e.g., SHA-based HMAC) as the data need not be available for re-keying. Referring now to FIG. 12, shown is a flow diagram of a re-keying method in accordance with another embodiment of the present invention. In the embodiment shown in FIG. 12, method 1150, which may also be performed by the TMP module, may perform re-keying without the associated data.

As illustrated, method 1150 begins by obtaining an encrypted MAC from memory (block 1160). At block 1170 this MAC may be decrypted using the old key. Thereafter, the MAC is encrypted with the new key (block 1180). Finally, at block 1190 the encrypted MAC is sent back for storage in memory. As illustrated, this re-keying performed without the associated data may be more efficient in terms of computation complexity and reduced bandwidth consumption. As with the above method 1100, understand that the re-keying shown in method 1150 may be performed iteratively for all MACs stored in the given MAC storage and in addition, these re-keying operations may be performed during idle periods of the TMP module and/or when a re-keying timer has expired.

Embodiments thus may be used to detect a rollback. Consider the following scenario:
DL1: Data line value at time t1
DL2: Data line value at time t2
MAC1: MAC associated with DL1
MAC2: MAC associated with DL2
MACKEY1: MAC key at time t1
MACKEY2: MAC key at time t2

If an attacker records DL1 and MAC1 and replays them at time instant t2 (at which point the MAC key has been refreshed), the MAC check will fail as MAC1 was calculated over DL1 using MACKEY1, and the hardware will generate the MAC over DL1 using MACKEY2. Hence, a rollback will be detected. Further this rollback detection occurs based on a re-keying in which only the MAC is fetched from memory for the re-keying. Embodiments thus provide low-overhead confidentiality, integrity, and rollback protection for data in a system memory (and/or other off-chip memory).

Figure 13:
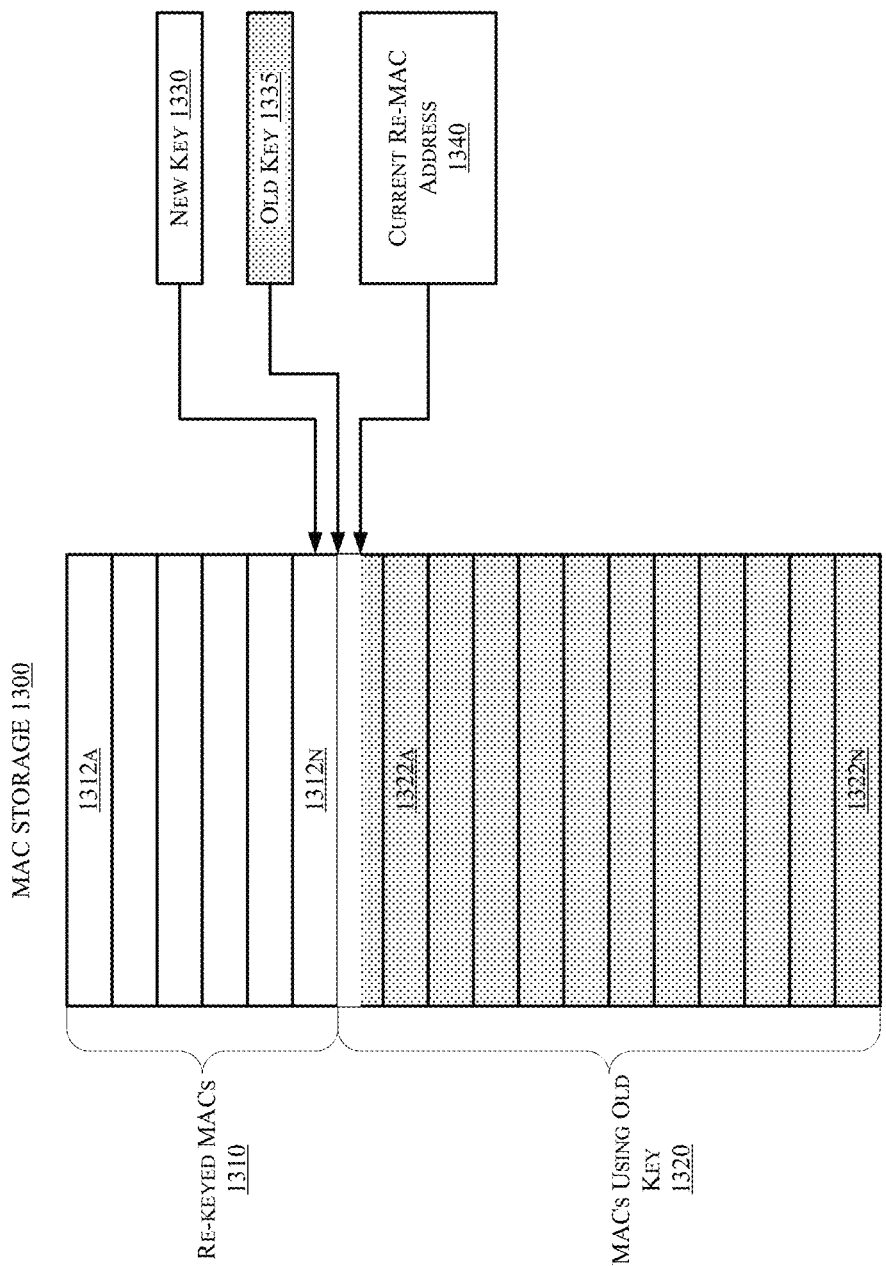
FIG. 13 is a block diagram of a MAC storage in accordance with an embodiment of the present invention.

Referring now to FIG. 13, shown is a block diagram of a MAC storage in accordance with an embodiment of the present invention. MAC storage 1300 may be a dedicated cache memory of a processor (such as TMP cache 145 of FIG. 1) or a region of a system memory. As seen, MAC storage 1300 includes a first region 1310 to store re-keyed MACs and a second region 1320 to store MACs generated with a prior key. Thus, entries 1312a-1312n store MAC values generated with a new key 1330, while entries 1322a-1322n store MAC values generated using an old key 1335. A pointer 1340 points to a location of the MAC that is currently undergoing re-keying. Understand while shown at this high level in the illustration of FIG. 13, many variations and alternatives are possible. Furthermore, note that while FIG. 13 shows a MAC memory as a contiguous range, embodiments are not so limited. In other cases, MAC values may be stored at non-contiguous locations of a memory. However, understand that such MAC values may have a definite relationship to a corresponding associated data line address such that given a data line address, the corresponding MAC also can be accessed.

Replay Integrity Trees

In some implementations, an integrity tree may be implemented based on the principle that only on-die resources are considered trusted. As internal, on-die storage is limited and expensive, only a portion of the integrity tree may be stored on-die, while remaining portions of the integrity tree are stored in protected memory. Different integrity trees use various combinations of counters and MAC tags (or hashes), offering tradeoffs between the size of the internal storage and the amount of protected memory, the cost/complexity of the tree "walk" verification flows, and the resulting performance. In some implementations, the MEE may implement schemes enabling a parallelizable encryption mode, a MAC algorithm that produces short MAC tags with a cheap hardware implementation, among other example feature.

Internal memory (or cache) of an example processor may be relatively small and may be accessed much faster than the system memory. During normal operation, memory transactions may be continuously issued by the processor's core(s) (e.g., 206A, 206B, 206C), and transactions that miss the cache may be handled by the memory controller (e.g., 210). The MEE 212, in some implementations, may operate as an extension of the memory controller 210, managing at least some aspects of the cache-system memory (e.g., DRAM) traffic that points to the protected region 204 of memory. An additional portion of the memory, called the "seized" or "stolen" region, accommodates the MEE's integrity tree. The union of these regions may be referred to as the "MEE region" forming a range of physical addresses that is fixed to some size at boot time (e.g., 128 MB), in a trustworthy way. In some cases, the entirety of the MEE region may be referred to as the protected or secured memory region. Read/write requests to the protected region may be routed by the memory controller 210 to the MEE 212, which encrypts (or decrypts) the data before sending (fetching) it to (from) the DRAM. The MEE 212 may autonomously initiate additional transactions to verify (or update) the integrity tree, such as based on a construction of counters and MAC tags (also referred to as embedded MACs). The self-initiated transactions access the seized region on the DRAM, and also some on-die array that serves as the root of the tree.

Figure 14:
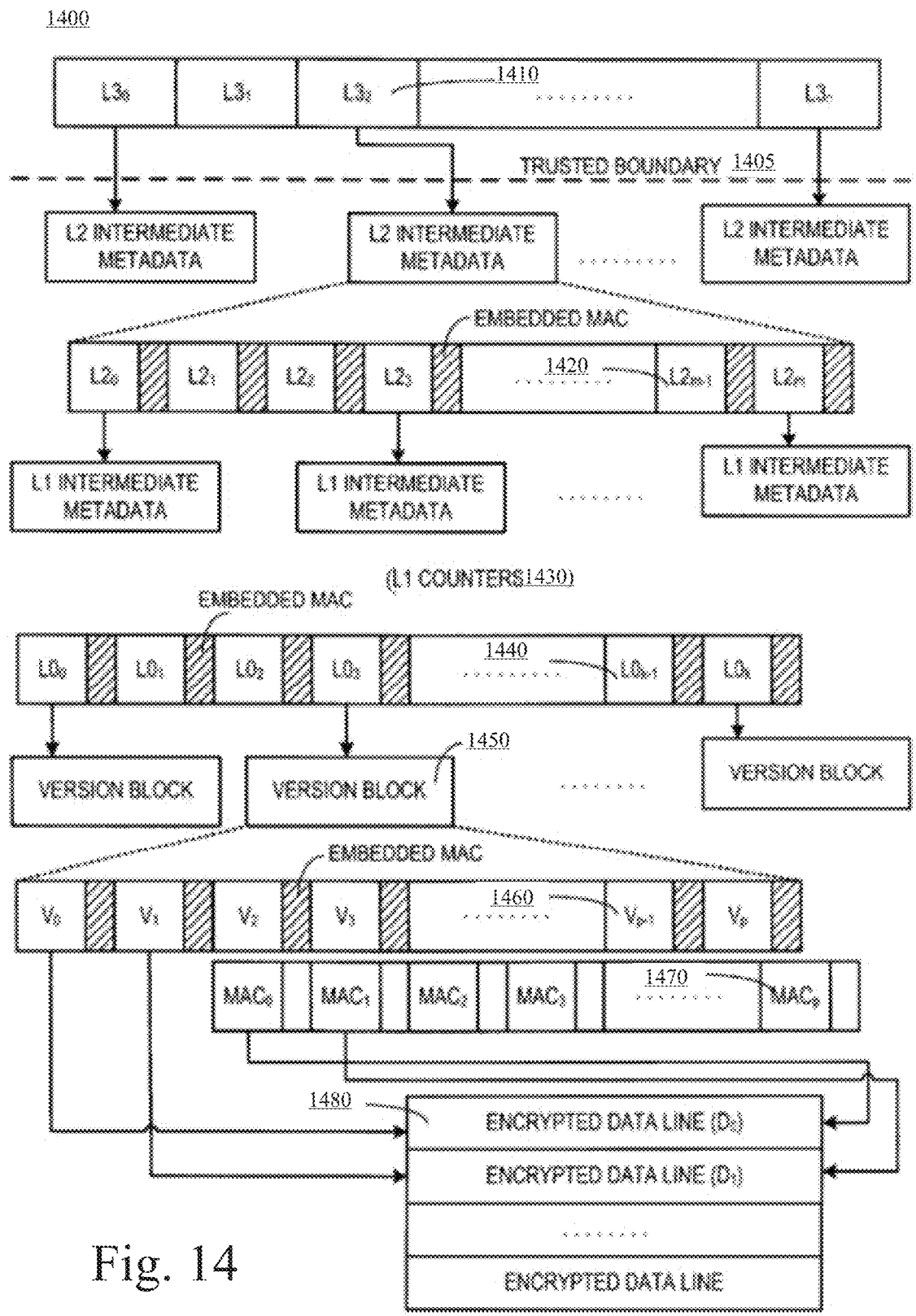
FIG. 14 is a schematic illustration of a replay integrity tree structure in accordance with some embodiments.

An integrity tree may serve as a mechanism for using a small amount of internal storage to protect a larger amount of data. For a memory encryption technology that can use an internal integrity key, embedded MACs may be used in layers of the integrity tree. The integrity may be considered tamper resistant based on at least the root (and, in some cases, only the root) being stored on-die. The pages within the protected memory region are "covered" by the integrity tree to guard against replay. FIG. 14 illustrates an anti-replay counter implemented through an example integrity tree structure for integrity and replay protections according to one embodiment. It should be noted that the counter mode encryption described herein represents but one example; other embodiments can work with alternative mechanisms of counter mode encryption. For instance, in alternative embodiments there may be more or fewer levels in the integrity tree structure than what is shown in FIG. 14, among other variants.

An integrity tree structure includes a hierarchy of levels of tree nodes. The top (root) level includes a sequence of on-die counters (i.e., L3 counters 1410), which are stored in the internal storage of the processor die. The internal storage includes, but is not limited to, the on-die Static Random Access Memory (SRAM), register files, and any other suitable memory in the processor die. As the L3 counters 1410 are on the processor die, their contents are trusted and secure from passive and active attacks. However, the trusted boundary (shown as a dotted line 1405) ends at the L3 counters 1410. In one embodiment, the lower levels of the integrity tree lie outside of the processor die (e.g., in the main memory 220 of the example of FIG. 2).

In one embodiment, each L3 counter 1410 is linked to a block of L2 intermediate metadata, which contains a sequence of L2 counters 1420. Each L2 counter 1420 is linked to a block of L1 intermediate metadata, which contains a sequence of L1 counters 1430. The blocks representing the L1 intermediate metadata and the L1 counters 1430 are omitted from FIG. 14 for simplicity of illustration. Each L1 counter 1430 is linked to a block of L0 intermediate metadata, which contains a sequence of L0 counters 1440. Each L0 counter 1440 is linked to a version block 1450, which contains a sequence of version nodes (represented by "V") 1460. Each version node 1460 is associated with an encrypted data line 1480 in the protected region (e.g., 225) of the main memory (e.g., 220). The content of a version node 260 may be the version of the associated data line, which provides a temporal component of the encryption seed in the counter mode encryption. The version is the seed that is to be encrypted to generate a cryptographic pad, which may then be exclusive OR-ed ("XOR-ed") with the cipher/plain text content of the data line generate the plain/cipher text. As the lower-level counters (including L2, L1 and L0 counters and the version nodes 260) are off the processor die and therefore are susceptible to attacks, each counter and each version node are encoded with an embedded Message Authentication Code (MAC) (shown as the blocks with hatched lines) to ensure their integrity.

In one embodiment, each embedded MAC is computed over the line in which they are embedded, using a corresponding counter from the next higher level as input. In the example of FIG. 14, the embedded MAC for the version block 1450 associated with L0.sub.3 (shown in FIG. 14 as the middle version block) is computed using the values of $V_o$-$V_p$ and its corresponding $L_0$ counter ($L0_3$). The value of this embedded MAC is stored striped in the line of the version blocks 1450 (shown as striped boxes in FIG. 14). The embedded MAC for each line of L0, L1 and L2 is computed similarly. L3 counters do not need embedded MACs because the contents of L3 counters are within the trusted boundary 1405.

The entire integrity tree built over the protected memory region, starting from the versions up to the L3 counters, provides replay protection to the data lines in the protected memory region. The process of replay protection is as follows. When a processor performs a read operation or a write operation to a data line, the MEE 250 loads a branch of the integrity tree that contains tree nodes (also referred to as branch nodes) identified by the address of the data line. The process of loading the tree nodes along a branch and verifying the authenticity of their values is herein referred to as a tree walk. Tree walks proceed from the bottom level of the integrity tree (i.e., the version nodes 1460) to the root nodes (i.e., the L3 counters). The authenticity of the tree node values needs to be verified because a major portion of the tree structure is resident in the main memory and therefore is susceptible to attacks. In case of a write, the tree walk is performed to verify the authenticity of the branch nodes values and update those values. In case of a read, the tree walk is also performed to verify the authenticity of the branch nodes values but without updating those values. In one embodiment, the MEE 250 contains a finite state machine circuitry that implements the tree walk.

In one embodiment, each encrypted data line 1480 is encoded with a MAC node 1470 containing a MAC computed from the content of the data line 1480. Each time the data line is written back to memory, the MEE 250 (e.g., of FIG. 2A) updates this MAC to reflect the most recent data value stored in memory. When a data line is read from memory, the MEE 250 verifies the value of its associated MAC node 1470 to establish the integrity of the data line being read. The use of the MAC nodes 1470 provides integrity protection against modification attacks on a memory-resident data line.

When the processor executes a write operation to write back one of the encrypted data lines 1480 into the protected memory region (e.g., when evicting a data line from an on-die last level cache to the protected region in the main memory), the MEE 250 identifies the version node 1460 and the L0, L1, L2 and L3 counters (1410-1440) associated with that data line. The MEE 250 updates the MAC 1470 associated with the data line and increments the version of that data line in the identified version node 1460. In addition, the MEE 250 also updates the identified L0, L1, L2 and L3 counters (1410-1440) of that data line, as well as the embedded MAC associated with the updated version and the counters. This update process proceeds from the bottom level of the integrity tree up to the root level of L3 counters, which are stored securely on the chip on the processor die and hence are guaranteed protection against attacks. The counters at each level of the integrity tree act as the versions for the next lower level ending with the version nodes 1460 storing the versions for the data lines. Hence, on a write to a data line, all of counters (including the version) and their associated embedded MACs along the branch identified by the data line's address are updated to reflect the version update.

In order to ensure replay protection, each time a data line is loaded from the protected region it is verified for authenticity against the tree nodes up to the root of the integrity tree. A mismatch at any level indicates a potential attack and raises a security exception, thereby defeating the attack. Specifically, when a processor executes a read operation on one of the encrypted data lines 1480, the MEE 250 identifies the version and the L0, L1, L2 and L3 counters (1410-1440) of that data line. Read operations do not alter the values of the version and the L0, L1, L2 and L3 counters (1410-1440). Upon a read operation, the MEE 250 verifies the MAC 1470 associated with the data line. In addition, the MEE 250 verifies the embedded MAC associated with each of the version, L0, L1, L2 and L3 counters (1410-1440). This verification process proceeds from the bottom level of the integrity tree up to the secure root counter L3.

In one embodiment, the tree nodes loaded in a tree walk are cached locally in an MEE cache, which is a local cache of the MEE 250. The MEE cache stores the values of the tree nodes (including the version nodes and the embedded MACs) that have been verified by previous requests. The content of the MEE cache is secure because it is located on the processor die. For read operations, a tree walk is terminated when the first node along the branch of the tree walk is found in the MEE cache. For write operations, a tree walk is terminated when the first node along the branch of the tree walk is found in the MEE cache and that the cached tree node is in the modified state.

To ensure that the integrity tree returns correct counter values for all requests, on a write request the MEE 250 completes the update to all of the tree nodes along the write request's branch before any other request (read or write) sharing any of those tree nodes can proceed. As read requests do not alter the values of the integrity tree, some of the read requests may be processed in parallel even though these read requests share one or more of the tree nodes in the integrity tree.

In accordance with the above, some embodiments enable parallelized tree walk that allows multiple read requests to proceed in parallel. The parallelized tree walk reduces the overhead for integrity and replay protections. The parallelized tree walk is based on the observation that read requests need not be serialized, as read does not modify any counter value in the integrity tree. However, write operations update the counter values in the integrity tree so proper ordering needs to be maintained. Dependency needs to be enforced for requests that involve a write to ensure that the correct counter values are used to perform authenticity checks. In one embodiment, the MEE 250 performs a dependency check upon receiving an incoming read request to determine whether the incoming read request shares any of the tree nodes with a previously received read request that is being processed by the MEE 250, and whether parallelized tree walks can be performed in the presence of the sharing of the tree nodes.

In some implementations, the protection and encryption of each line (or "cache line") of protected memory may be enabled through supporting data, or "metadata", including the integrity tree (and the embedded MACs of the integrity tree layers), a version value, and a MAC value for the line. This metadata, or "security metadata" as referred to herein, may impose significant storage overheads, in some cases representing a 25% storage overhead, which may discourage the use of this technology in some applications. This overhead, in traditional implementations, may be static, such that memory is preallocated, or is "stolen", to hold security metadata irrespective of whether corresponding lines or pages of protected memory are actually allocated and used by enclaves within a system, among other example issues.

In some implementations, indirection directories may be provided to reduce security metadata overheads by up to 94%. For instance, in a traditional implementation imposing a 25% storage overhead to support corresponding security metadata, the use of an indirection directory may allow only 1.5% of memory to be reserved. Further, an indirection directory implementation may additionally afford for the dynamic allocation of additional protected memory and corresponding security metadata (e.g., depending on the memory used by enclaves on the platform). Further, indirection directories may be combined with other security metadata overhead optimization solutions to yield even further benefits, such as major/minor counters and crypto cache lines.

Turning to FIG. 15, an example is illustrated of the cache line sizes and corresponding amounts of security metadata provided to implement a counter mode encryption scheme to protect memory of an example system. For instance, table 1505 shows that to protect roughly 96 MB of data, a total of approximately 26 MB of security metadata is to be used. Nearly 24 MB of this security metadata is provided through the MAC and Version values to be provided for corresponding pages of data. Accordingly, to pre-allocate this block of protected data in one example (illustrated by diagram 1510), nearly 25% of the entire allocated data 1514 is reserved for storage of the security metadata 1512. Through the use of an indirection directory, however, the indirection directory stores pointers (e.g., for page of protected memory) to point to a portion of security metadata, which may be allocated dynamically (and outside the region of data reserved for protected data). In one example, the metadata for lower levels in the tree (e.g., the MAC and Version layers) for a memory page may be allocated dynamically in memory and pointed to by corresponding indirection directory pointers. Accordingly, the metadata for lower levels in the tree (which takes up the majority of the security metadata storage overhead used to implement a corresponding counter mode encryption scheme) may be instead allocated dynamically. Additionally, page conversion instructions may be further introduced to provide the flexible addition (e.g., conversion) of pages to protected memory by allowing for corresponding security metadata to be flexibly added (and pointed to using the indirection directory), among other example benefits. For instance, diagram 1515 illustrates the savings in overhead over the example in diagram 1510, with only the lower levels of the integrity tree and the indirection directory being pre-allocated for a block of protected memory, thereby realizing a minimal storage overhead of approximately 1.5%. Further, implementations of an indirection directory may impose minimal additional perform overheads, which are only limited to those applications and processes making use of corresponding pages of protected memory.

In the example of FIG. 15, the diagram 1515 illustrates an implementation where the counter tree (other than the top-level counters) is stored in memory. In an example with a 56 b MAC and a 56 b version value, eight MACs and eight version values can each be stored in a single cache line. An indirection directory (e.g., 1530) may be provided based on the observation that majority of storage overhead in the MEE replay tree are due to the lower level nodes (i.e., the MAC and version values). Further, in this particular example, L3 is the top-level in the replay tree and stored in on-die memory. The intermediate levels of the replay integrity tree, L0-L2, require only 1.3% of the overall protected memory (128 MB in this example). With indirection directories, for an N-level tree, tree levels L0 to LN-1 are stored in stolen memory. The lower levels of metadata (MAC and version) may be dynamically allocated, for instance, when a page of memory designated for protection, such as when it is converted to be used with an enclave.

The MEE hardware computes the addresses of all tree nodes for a particular access on admittance of the memory request to the MEE engine. With a traditional MEE design (represented by diagram 1510), because the entire storage for the replay tree (i.e., the entire security metadata) is reserved in memory, there is a 1:1 fixed mapping of the replay tree nodes from the request address. With an MEE utilizing an indirection directory, because the allocation of the lower level in the trees is dynamic, the MEE hardware cannot directly compute the tree node addresses to start the tree walk from the data line address itself. In order to allow MEE to fetch the tree nodes, the MEE may access the indirection directory to obtain any security metadata not already allocated in memory. An indirection directory stores pointers to pages where the lower nodes in the tree for a physical page are stored. Each page in physical memory has a unique entry in the indirection directory to allow system software to store a pointer to the lower level security metadata for any physical page. As shown in diagram 1515, the indirection directory 1530 is also pre-allocated in fixed/stolen storage. For instance, in an example implementation using a 64 b physical address pointer for each page, the indirection directory would results in an additional 0.2% of storage overhead. The indirection directory combined with the storage for higher levels in the tree results in a total fixed storage overhead of 1.5% for indirection trees.

As noted above, an example MEE may embody two primary cryptographic mechanisms, memory encryption and integrity/replay protection designed to defend against passive and active attacks respectively. Memory encryption is primarily designed to protect against a class of hardware attacks where the attacker tries to silently observe the data lines as they move on and off the processor chip (passive attacks). In order to defend against these attacks, an MEE may employ encryption to the MEE region. In essence, when a data line moves to memory it is encrypted by the MEE on-chip before getting stored in the main memory. On a memory read to the protected region, the data line is first decrypted by MEE before being fed to the processor. Encryption and decryption may utilize counter mode encryption. This can allow the cryptographic work required to encrypt/decrypt a data line to be decoupled from the data itself. This may be done by encrypting a seed (or "version" node) (independent of the data) which is uniquely associated with a respective data line. Each data line to be encrypted may have an associated version seed. The seed is encrypted (to create a "pad") to be used to encrypt/decrypt the data line by XORing the cryptographic pad with the data line.

Returning to the discussion of the example of FIG. 14, an integrity tree 1400 provides a high-level counter tree organization used to protect the integrity and ensure replay protection of the data lines in the memory range protected by an MEE. As discussed above, the counter tree consists of MAC nodes, version nodes, and metadata nodes, and the top-level (or L3) counters. For each data line in the MEE region, a per data line MAC value is associated. Each time the data line is written back to memory, this MAC is updated to reflect the most recent data that is stored in memory. When a data line is read from memory, the MEE verifies its MAC as well. This ensures protection against modification attacks on the data line while it was resident in memory, providing integrity protection to the MEE region. The version nodes hold the version of a data line which is incremented each time a data line is written back to memory. A metadata node in the counter tree (L0, L1, L2) consists of counter values and an embedded MAC, computed over the counters stored in the node. As an input to the embedded MAC, a counter from the next higher level in the tree is used. This process continues up to the root counters or top-level counter (L3), which are stored securely on the chip in SRAM. In some implementations, these L3 counters are never evicted off the processor chip and hence are guaranteed protection against attacks. In essence, the counters at each level in the tree act as versions for the next lower level ending with the version nodes storing the versions for the data lines. Hence, on a write to a data line, all counters (including the version) and associated embedded MACs along the data line's branches must be updated to ensure that the counters along the tree branch now reflect this update. In order to ensure replay-protection, each time a data line is loaded from the protected region, it is verified for authenticity against the tree nodes up to the root. A mismatch at any level indicates a potential attack and raises a security exception, thereby defeating the attack.

The process of loading the tree nodes along a branch and verifying their authenticity embodies a "tree walk". For instance, in the case of a write, the tree walk is done to load the tree nodes that need to be updated and verify their authenticity as they were resident in the main memory. In the case of a read, the tree walk also establishes the integrity of the data line read. MEE contains logic (e.g., as implemented through an execution unit and corresponding instruction), which implements the tree walk. In some cases, at least some of the tree nodes loaded in a tree walk may be cached locally in an MEE specific cache. With the MEE cache, a tree walk may be terminated when the first node along the tree walk is found in the cache (for writes, the cached tree node should be in modified state for the walk to be terminated). This is the case as a node in the MEE cache is considered to be secure, as it was verified by a previous request before being cached and serves the same purpose as the L3 node on the processor chip.

As noted above, an MEE-based architecture may be enhanced through the provision of an indirection directory to allow at least some of the security metadata used by the MEE to be allocated on the fly (and potentially anywhere in memory), rather than pre-allocating most or all of the security metadata together with the reservation of memory for a protected region. In one example, the only security metadata that is to be pre-allocated are the layers 1525 of the integrity tree above the MAC and version nodes and below the top layer(s) (e.g., L3) stored in on-die memory. The indirection directory 1530 may also be pre-allocated, as shown in FIG. 15. All other security metadata (e.g., the MACs and versions of secured pages) may be dynamically allocated in other memory regions (e.g., 1550). For instance, upon identifying data to be protected in a particular page designated for secure memory, a separate security metadata page 1545 may be identified or created and pointed to by the indirection directory 1530. The MAC and version values for the protected page may be calculated and loaded into the security metadata page 1545. The MEE may consult the indirection directory to identify a pointer corresponding to the particular page that points to the security metadata page 1545, which the MEE may use to access the MAC and version for the page, complete an associated tree walk, and perform encryption/decryption of the data of the particular page.

Figure 16:
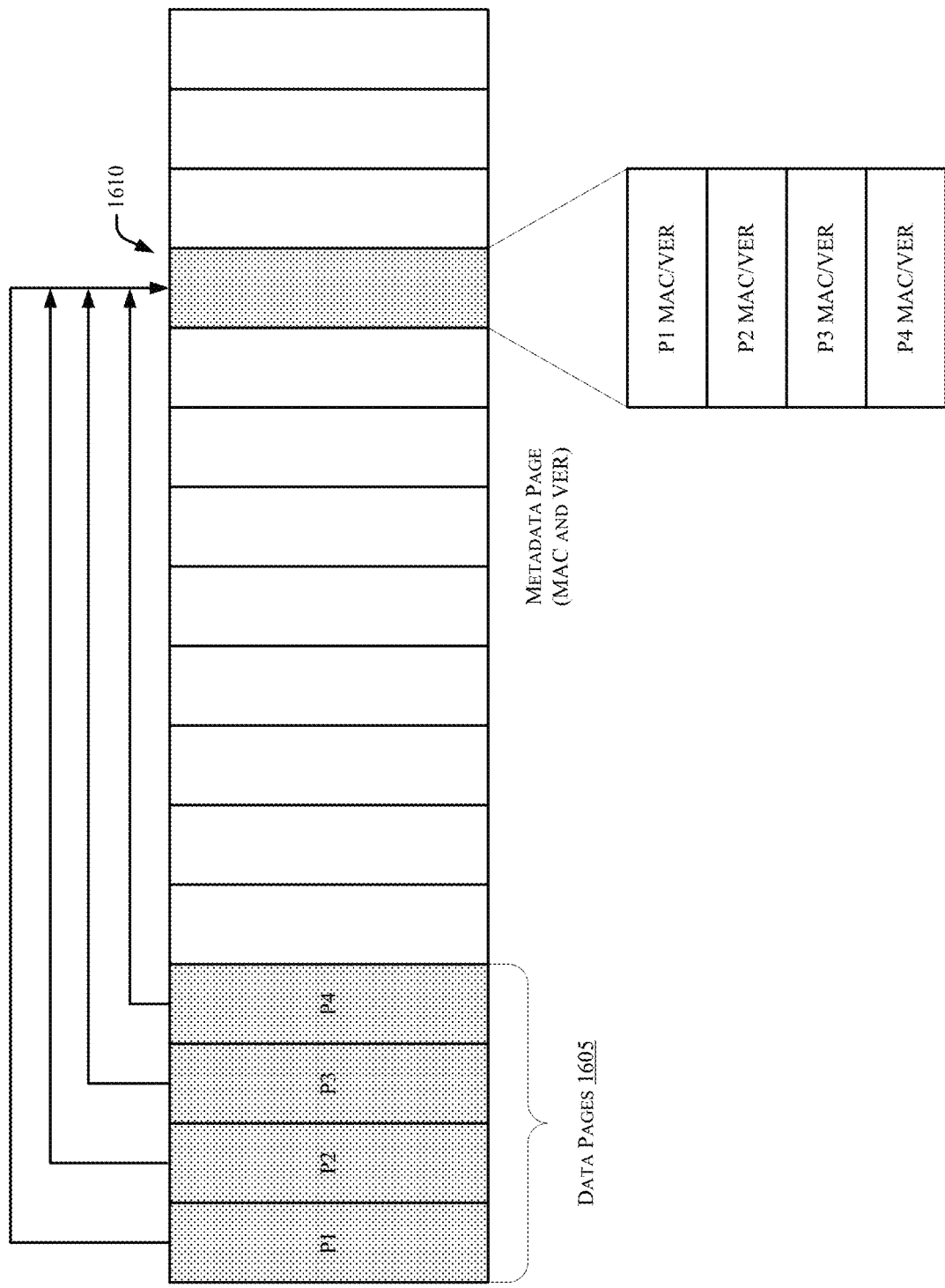
FIG. 16 is a block diagram of a memory authentication code (MAC) storage in accordance with some embodiments.

Turning to the simplified block diagram of FIG. 16, example address mappings are shown to illustrate pointers of an example indirection directory. As noted above, with indirection directories, the upper levels in an integrity tree may continue to be stored in stolen memory and hence the mappings to those levels can be computed directly by the MEE from the request address of the protected page. The MAC and version (VER) levels, on the other hand, are not fixed or reserved in memory, and are instead allocated dynamically. Moreover, MAC and VER data can be potentially located anywhere in memory. Flexible EPC architecture introduces two instructions, EMKEPC and EMKNON-EPC to convert a regular page to secure and vice-versa respectively. Indirection trees extends these instructions When a new page of memory is designated as secure (e.g., by adding the page to protected memory or converting an existing, regular page to protected memory, etc.) additional memory is allocated for the storage of the MAC and VER of that page. Further, the location of this additional memory allocated for the MAC and VER may be documented in a pointer within the indirection directory 1530. MEE hardware may then utilize the indirection directory to fetch and update the MAC and VER data for any corresponding, protected page. In some implementations, a security metadata page may be created to contain MAC and VER data for one or more protected pages. The indirection directory may point to such security metadata pages to allow an MEE to extract MAC and VER access from the security metadata page.

In one example, a MAC and VER line can store metadata for 8 data lines each. Hence for a single page (e.g., 64 data lines), 8 cache lines for MAC and 8 cache lines for VER are needed allowing a single memory page to store lower level metadata (MAC and VER) for 4 pages of protected memory. Accordingly, in such an example, a single security metadata page may be used to store the MAC and VER information for a block of 4 protected memory pages. In such implementations, when a new security metadata page is allocated, it may be additionally used to store MAC and VER information for up to three subsequently allocated protected pages. Accordingly, system software, along with tracking other attributes of a physical page, may track whether metadata for a particular page in memory is already allocated and in use. In the above example, this can be done at the granularity of 4 memory pages. The whole memory can be viewed, in this example, as contiguous groups (e.g., 1605) of 4 memory pages and for each group, a single metadata page 610 (storing MAC and VER lines (e.g., 1615)) is provided, such as illustrated in FIG. 16. If for a group, a metadata page has been allocated for any of the member pages, a new metadata page is not allocated when a different member page is converted to secure. In some instances, within each metadata page (e.g., 1610), the mappings within the corresponding group 1605 of four memory pages are fixed. In some instances, during the lifetime of the system, system software may not find enough contiguous pages for allocation as a group (e.g., of four contiguous pages), resulting in some entries in the corresponding security metadata page being unused (e.g., to reflect a grouping of less than four pages). Such situations may be acceptable as, on balance, high utilization of the dynamically allocated security metadata pages is attainable.

It should be appreciated that the example of FIG. 16 is provided for illustrative purposes only and that other examples may utilize pointer values, cache lines, memory pages, MAC and VER values, etc. of different sizes than illustrated in the particular example of FIG. 16. Further, it should be appreciated that a single security metadata page may be provided to store security metadata for multiple protected pages (i.e., with the grouping of protected pages being potentially less than or more than the four illustrated in the example of FIG. 16). As other variants, different security metadata may be included in security metadata pages than set forth in the prior example, such as in implementations using a different version of an integrity tree, among other alternative features and implementations.

Figure 17:
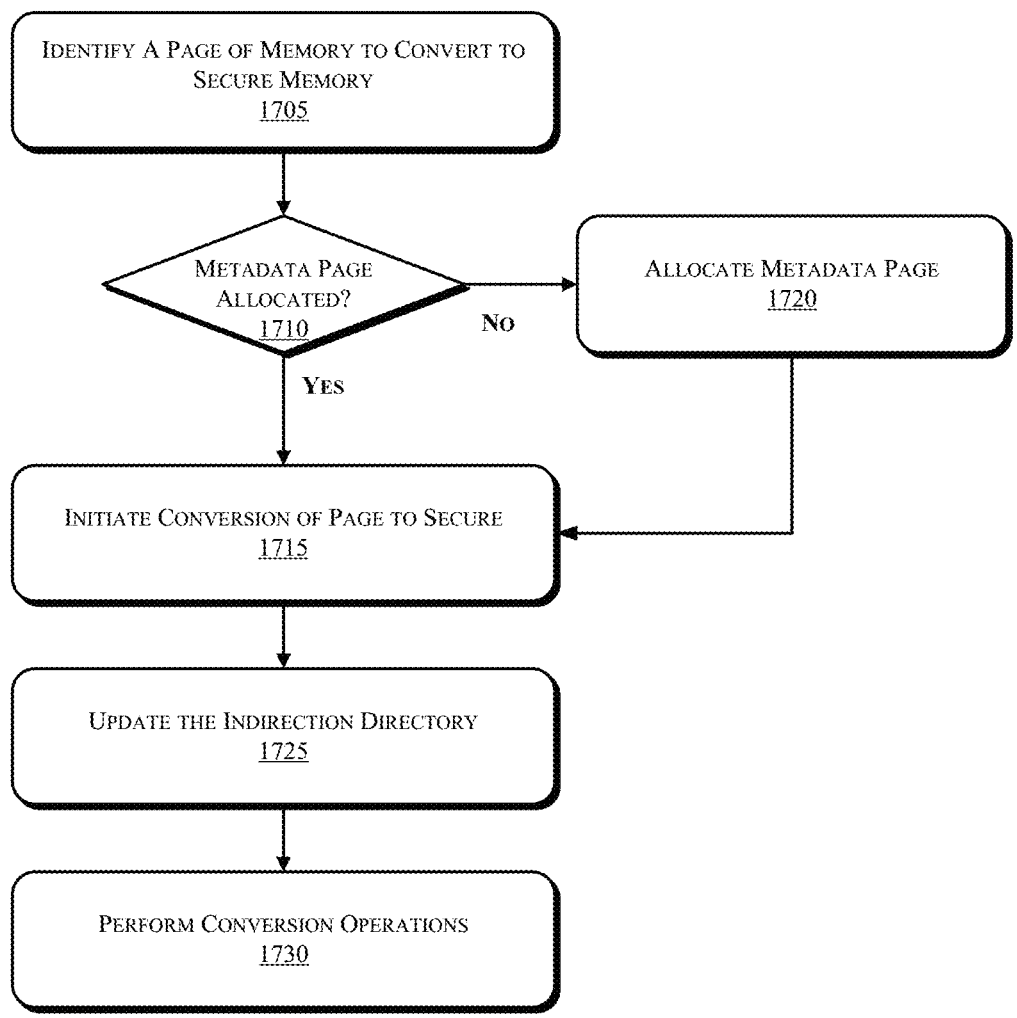
FIG. 17 is a schematic illustration of a counter line in accordance with some embodiments.

Turning to the flowchart 1700 of FIG. 17, an example technique is illustrated for adding a new page to protected memory. In this example, system software identifies 1705 a page of memory to convert to secure (protected) memory. In this example, security metadata pages may be provided, which may store security metadata for a contiguous block of multiple pages of memory (such as in the example of FIG. 16). Upon allocating a page of memory to secure, the corresponding security metadata page is to be mapped to the physical page through the indirection directory. For instance, a fixed 64 b slot may be provided in the indirection directory for each physical page in memory. This slot is used for the address of the security metadata page for the physical page which will then be used by the MEE in its tree walk. For instance, when the system software has a page to convert to secure, it may first check (at 1710) to see (using internal tracking information) if a security metadata page has already been allocated for carrying the lower level metadata (MAC and VER) for the page being converted (e.g., because another memory page in a group of memory pages covered by the metadata page has already been allocated). If the security metadata page has already been allocated, system software may proceed to convert 1715 the page to secure. If not, the system software allocates 1720 a page of memory to serve as the security metadata page for storing at least some of the security metadata (e.g., MAC and VER values) for the page to be converted to secure.

In some implementations, converting 1715 a page to secure can involve calling a specific instruction to be executed using microcode of the processor. The instruction may take, as inputs, the address of the particular physical page being updated to secure and the address of the security metadata page to be used to store security metadata (e.g., MAC and VER values) in association with securing the particular physical page. Upon execution of the instruction, the core microcode can update 1725 the indirection directory entry corresponding to the physical page converted to carry the address of the metadata page. In this example, the indirection directory memory is stolen and cannot be accessed by software directly. Conversion 1715 of the page to secure can further cause additional conversion operations to be performed 1730, such as flushing MEE internal cache, resetting version counters, etc. With the page converted to secure, the page may be available for use by an enclave with the address mappings fully installed.

Figure 18:
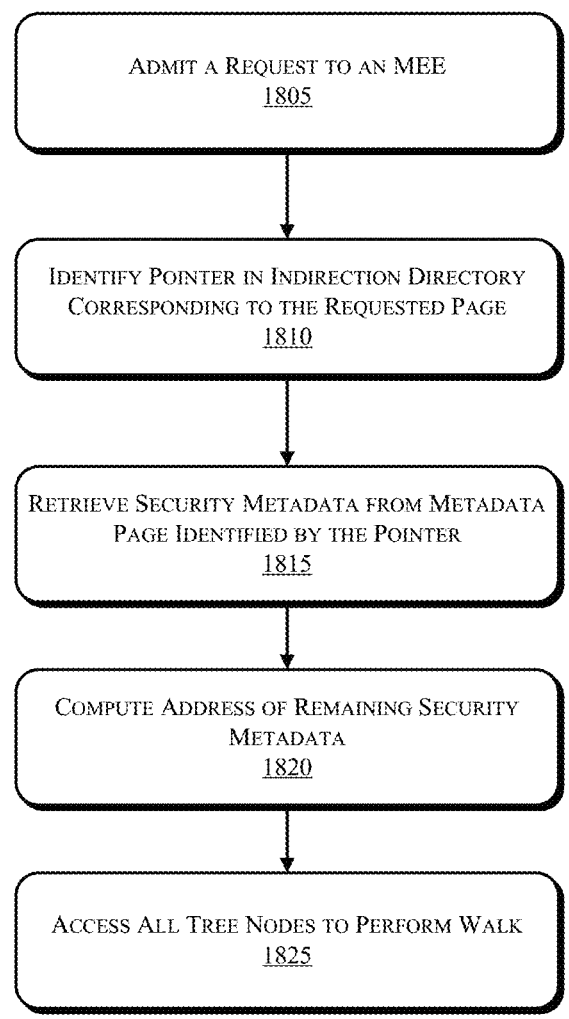
FIG. 18 is a flowchart illustrating operations in a method to implement key rotation in accordance with some embodiments.

Turning to the flowchart 1800 of FIG. 18, with a page converted or otherwise added to secure memory (such as described in the example of FIG. 17), an MEE may be utilized to manage the encryption, decryption, and verification of data to be included in the page. For instance, as introduced above, when processing a request involving a line of data from a protected memory page, the MEE may perform a tree walk of an integrity tree to validate security of the data. For instance, on admitting 1805 a request, the MEE hardware may compute 1810 the address of the indirection directory for the physical page on which the request resides. Using the indirection directory value (a pointer to the corresponding security metadata page), the MEE may retrieve 1815 metadata (e.g., the MAC and VER) for the request that is not in fixed, stolen memory. For instance, the MEE may identify the address of the security metadata page from the indirection directory and extract the MAC and VER lines for the memory access. The MEE may use the request address to compute 1820 the addresses of remaining security metadata stored in stolen memory (e.g., at least some of the higher levels in the integrity counter tree) to access 1825 all tree nodes needed to complete a tree walk in connection with the request (in 1805).

In implementations using indirection directories, such as described above the system software can use the security metadata pages referenced by the indirection directory as a regular page or even convert it to a secure page once all the memory pages that are using the metadata page have been converted to regular. Any incorrect operation by system software may be caught by MEE hardware as an integrity failure and hence no special operations may need to be added (e.g., a conversion instruction from secure to regular) and no special protection hardware provided to protect the integrity of security metadata pages. While introducing an indirection direction may extend a tree walk by on level (in the worst case), the savings realized in storage overhead of related security metadata is significant. In some cases, the modest penalty resulting from accessing an indirection directory can be minimized by caching the indirection directory in the MEE cache and with spatial locality in the application, majority of accesses should find the indirection directory value in the cache, avoiding the additional access to memory, among other example enhancements.

Key Rotating Trees with Split Counters

Memory encryption is primarily designed to protect against a class of hardware attacks where the attacker tries to silently observe the data lines as they move on and off the processor chip (passive attacks). In order to defend against these attacks, MEE employs encryption to the MEE region. In essence, when a data line moves to memory it is encrypted by the MEE on-chip before getting stored in the main memory. On a memory read to the protected region, the data line is first decrypted by MEE before being fed to the processor. Some processors use a type of counter mode encryption. In counter mode encryption, the cryptographic work required to encrypt/decrypt a data line is decoupled from the data itself. This is done by encrypting a seed (independent of the data) which is uniquely associated with each data line. The encrypted seed called the pad is used to encrypt/decrypt the data line by XORing the cryptographic pad with the data line.

While the MEE affords a high level of security against hardware attacks, it results in significant performance and storage overheads for the security metadata. In some examples a MEE can impose significant storage overheads. Some processors do not limit the protected memory usage, effectively allowing the entire memory on the platform to be protected by the MEE) and hence these overheads can act as a hindrance in the adoption of these technologies. In some processor implementations, MEE protects 96 MB of data and uses 32 MB for security metadata. This is illustrated in FIG. 5A, in which the overhead of secure memory 510 (i.e., MAC 514, version counters 516, and tree levels $L_0$ to $L_{N-1}$ consume approximately 25% of the memory 510, leaving 75% for the secure memory payload 512.

To address these and other issues, subject matter herein describes rotating trees (KR-Trees) which involves combining a counter tree analogous to that described with reference to FIG. 14 with key rotation as described above to achieve a more efficient replay protection solution. Key rotation prevents hardware replay at a macro granularity such that an attacker cannot conduct replay across key refreshes. However, there is a period of time, referred to herein as a vulnerability window, that is left open to attack with key rotation alone. This is the window or time period between key refreshes for a particular memory block, allowing for successful replay attacks. In accordance with subject matter described herein, shallow counter trees are used to prevent replay attacks during the vulnerability window. Since the replay tree counters only have to account for the smaller window of time, the replay counters can be made significantly smaller (as much as 8× or more), resulting in counter trees that are much shallower (i.e., have far fewer layers). KR-trees reduce the storage overhead by reducing the counter sizes (in current implementations, the counters in the tree can take up to 50% of the overall storage overheads) and as a result also reduce the levels in the tree, thereby reducing the number of accesses that need to be made to memory to verify freshness of a data line, directly resulting in improved performance.

Figure 19:
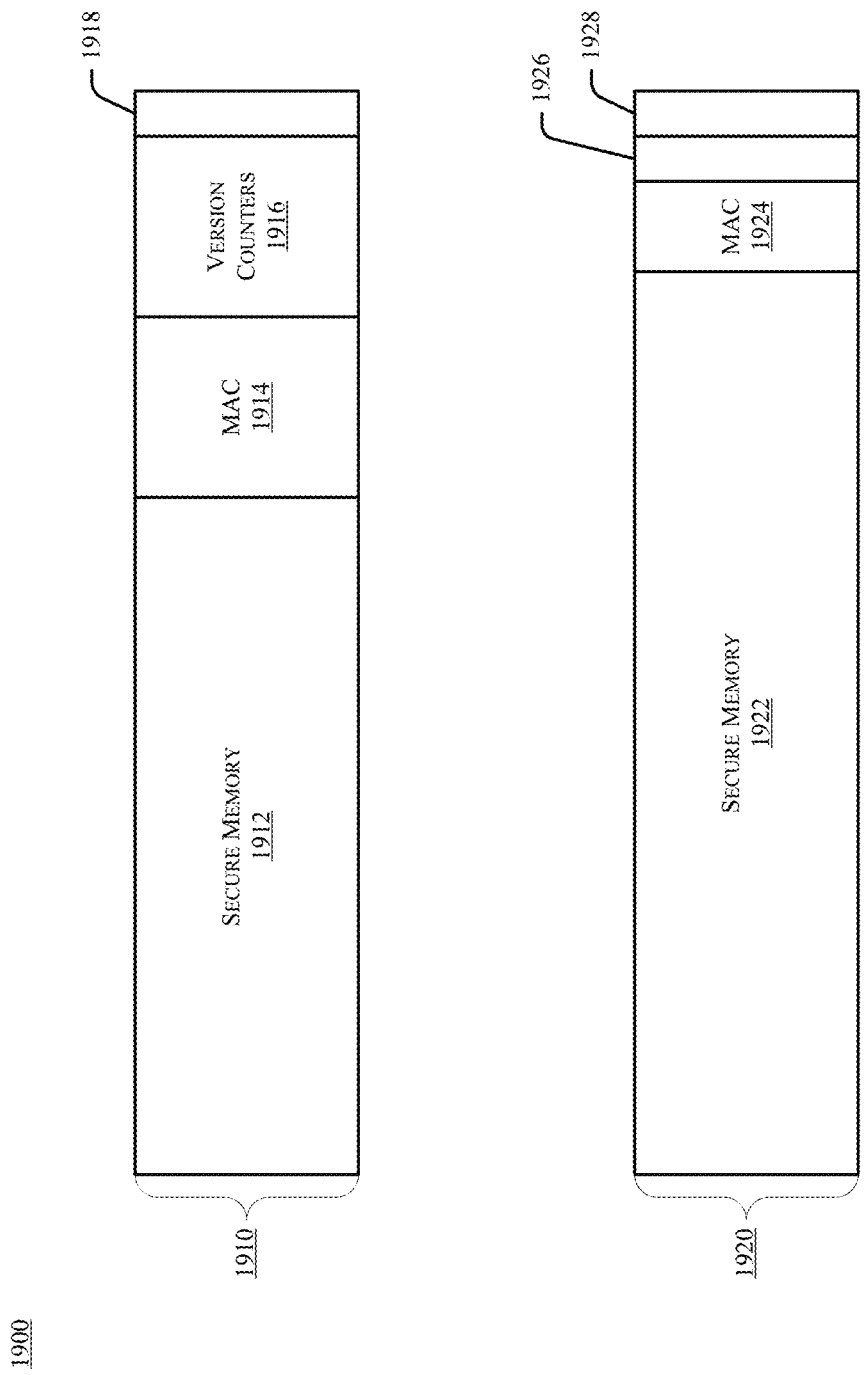
FIG. 19 is a schematic illustration of key rotation in accordance with some embodiments.

Referring to FIG. 19, subject matter described herein allows the storage overheads for hardware replay protection to be significantly by 2-4× while improving performance overheads at the same time, thereby resulting in a much more efficient replay protection solution. Thus, the overhead of secure memory 1920 (i.e., MAC 1924, version counters 1926, and tree levels $L_0$ to $L_{N-1}$ 1928 consume far less than 25% of the memory 1920, leaving far more than 75% for the secure memory payload 1922.

Figure 20:
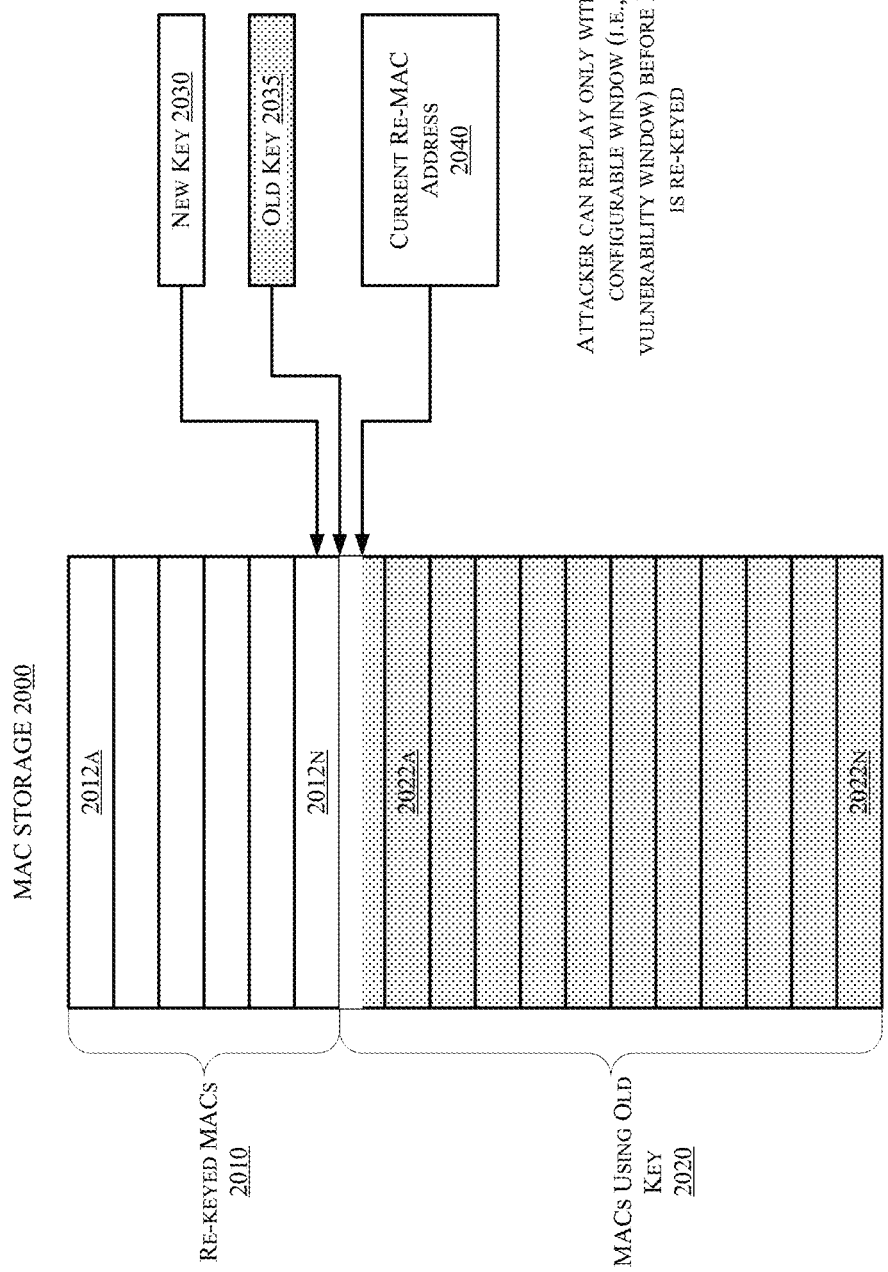
FIG. 20 is a block diagram of a MAC storage in accordance with an embodiment of the present invention.
Figure 21:
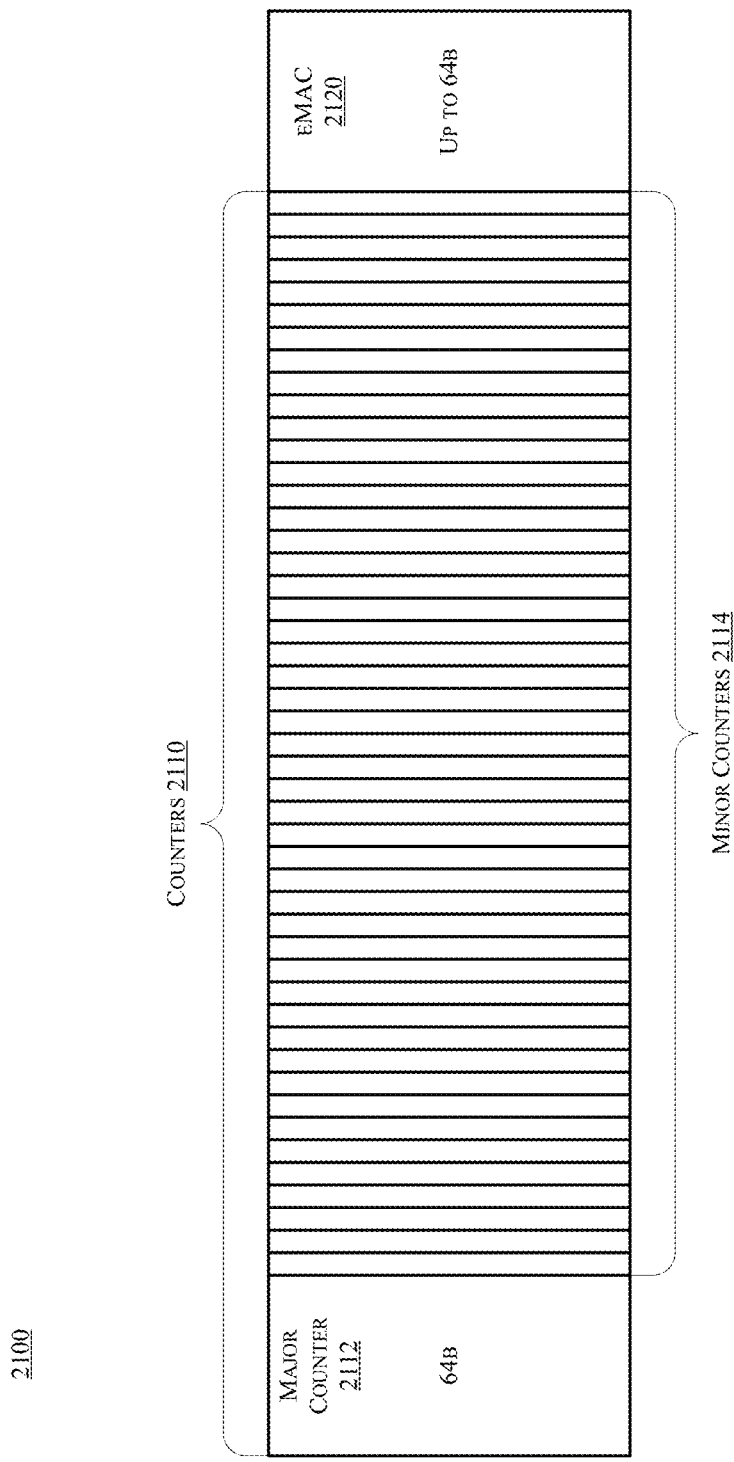
FIG. 21 is a schematic illustration of a counter line in accordance with some embodiments.

FIG. 20 illustrates aspects of key rotating trees (KR-Trees) proposed for use in conjunction with traditional counter-based replay trees to achieve a highly efficient implementation of hardware replay protection. With key rotation, the MAC values in memory are refreshed constantly by re-encrypting them periodically. Referring to FIG. 20, MAC storage 2000 may be a dedicated cache memory of a processor or a region of a system memory. As seen, MAC storage 2000 includes a first region 2010 to store re-keyed MACs and a second region 2020 to store MACs generated with a prior key. Thus, entries 2012a-2012n store MAC values generated with a new key 2030, while entries 2022a-2022n store MAC values generated using an old key 2035. A pointer 2040 points to a location of the MAC that is currently undergoing re-keying. Understand while shown at this high level in the illustration of FIG. 20, many variations and alternatives are possible. Furthermore, note that while FIG. 20 shows a MAC memory as a contiguous range, embodiments are not so limited. In other cases, MAC values may be stored at non-contiguous locations of a memory. However, understand that such MAC values may have a definite relationship to a corresponding associated data line address such that given a data line address, the corresponding MAC also can be accessed.

FIG. 20 shows a key rotation cycle in progress. In some examples a key rotation engine 219 reads the MACs with the old key and re-encryption them with a new key. With key rotation, hardware replay is only possible for a given cacheline during a time interval when the cacheline has the same key. As an example, an attacker recording data line and associated MAC cannot replay the cacheline and MAC at a later point in time after the key used by the rotation engine has changed. This time window when an attacker can conduct a successful replay is referred to herein as the vulnerability window. While key rotation significantly reduces the performance and storage overheads by eliminating the replay tree altogether, it does not provide deterministic anti-replay guarantees as the vulnerability window still exists. While the key rotation process explained here rotates the key on MACs, for KR-trees, we rotate or refresh the key associated with the entire memory. Note that KR-trees can easily be extended to rotate only the keys associated with the MACs.

Thus, KR-trees combine a key rotation engine with a counter-based replay tree. More specifically, the version counters in the counter tree are sized to only prevent replay within the vulnerability window. This allows the counters to be made much smaller than the existing 56 b per cacheline design.

FIG. 7 shows the organization of a counter line in accordance with an embodiment. Referring to FIG. 7, key rotation allows for much smaller counters for deterministic hardware replay protection, thereby allowing the total levels in the tree to be reduced. In a traditional replay tree, the base counters are 56 b, allowing for 8 counters to be packed together. A minimally invasive KR-trees organization will pack additional counters only at the version level. Table I below shows the reduction in number of levels with such a tree organization.

TABLE 1

Base KR-Trees Tree level reduction

| Protected Memory Size (GB) | Number of levels with traditional trees | Number of levels with KR-trees |
|---|---|---|
| 128 MB | 5 | 4 |
| 1 GB | 6 | 5 |
| 128 GB | 8 | 7 |
| 1 TB | 9 | 8 |

This organization of KR-trees reduces the number of levels in the tree by 1. It should however be noted that the storage overheads with such an organization are reduced by ~2× as the first level counters (or version counters) in the tree occupy 12.5% of the overall 25% storage overheads required for an anti-replay tree. With the 8× reduction afforded by KR-trees, this overhead for version counters is down from 12.5% to 1.6%. This results in bandwidth and performance benefits as the metadata cache used to cache counters in the encryption engine now becomes much more efficient as it acts as a cache for a much smaller region in memory. While the rest of the invention will describe flows for this organization of KR-trees, it should be noted that we can be more aggressive and apply the reduction at all levels in the tree. Table II shows the number of levels for different memory sizes with this aggressive version of KR-Trees.

TABLE 2

Aggressive KR-Trees Tree level reduction

| Protected Memory Size (GB) | Number of levels with traditional trees | Number of levels with KR-trees |
|---|---|---|
| 128 MB | 5 | 3 |
| 1 GB | 6 | 3 |
| 128 GB | 8 | 4 |
| 1 TB | 9 | 5 |

As can be seen from the table, aggressive KR-trees can help significantly reduce the total number of levels in the tree, thereby improving performance and reducing bandwidth requirements of hardware replay protection. However, this comes at additional complexity as the minor counter anti-rollover algorithm now needs to be applied to all levels in the tree. It should also be noted that the overhead can further be reduced by reducing the size of the MACs from the currently proposed 64 b to 32 b which can provide an additional 2× improvement in storage overheads, taking the overall overheads to 4× lower than standard trees.

Figure 22:
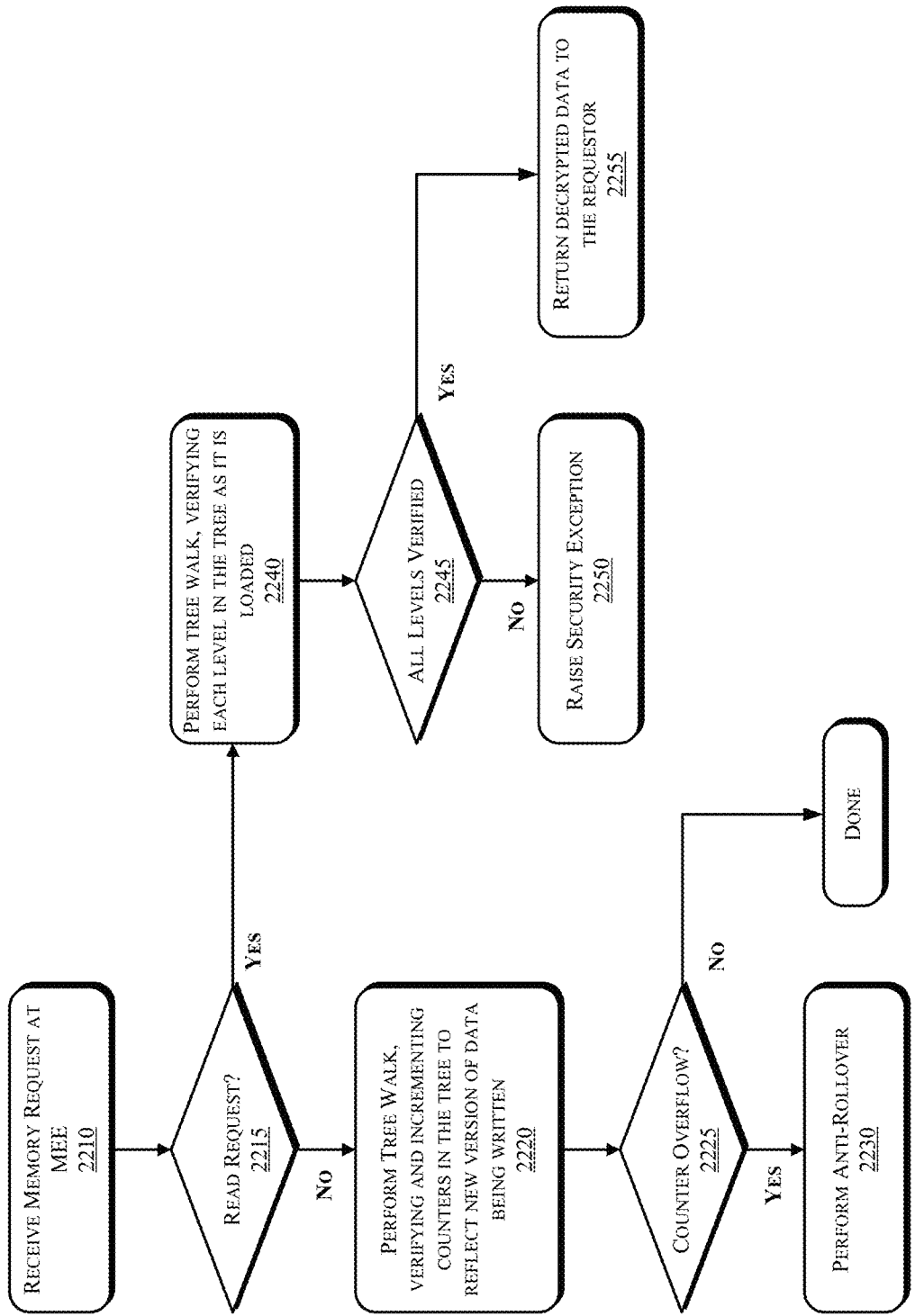
FIG. 22 is a flowchart illustrating operations in a method to implement key rotation in accordance with some embodiments.

FIG. 22 is a flowchart illustrating operations in a method to implement key rotation in accordance with some embodiments. More particularly, FIG. 22 depicts operations implemented for read and write operations inside a vulnerability window. In some examples the operations depicted in FIG. 22 may be implemented by the memory encryption engine 212.

Referring to FIG. 22, at operation 2210 a memory request (i.e., a read request or a write request) is received at the memory encryption engine (MEE) 212. For example, the read or write request may have been directed to the memory controller 210 which determines that the read or write request is directed to a memory address within the protected/encrypted memory module 204. Accordingly, the memory controller 210 may pass the read or write request to the memory encryption engine 212.

If, at operation 415, the operation is not a read request (i.e., if it is a write request), then control passes to operation 2220 and the memory encryption engine performs a tree walk verifying and incrementing counters in the tree to reflect a new version of the data being written. If, at operation 2225, a counter overflow does not occur then the write request is complete. By contrast, if at operation 2225 a counter overflow occurs then control passes to operation 2230 and an anti-rollover operation is implemented.

Referring back to operation 2215, if the memory request is a read request then control passes to operation 2240 and a tree walk is performed, verifying each level in the tree as it is loaded. If, at operation 2245, all levels are verified, then the decrypted data is returned to the requestor. By contrast, if at operation 2245, not all levels can be verified, then a security exception is raised. A suitable alert may be generated and appropriate remedial action may be taken.

At the time of a key refresh for a line in memory, the line is re-encrypted with the new key. In order to allow the small counters to again be capable of covering the vulnerability window (minimizing the probability of rollover inside a vulnerability window), the minor counters are reset at re-encryption time. The major/minor counter organization used with KR-tree works naturally with key rotation. At the time of re-keying, the data lines are read from memory in a special mode where the encryption engine in addition to re-encryption with the new key resets the minor counter, increments the major counter and uses the new combination as the counter to encrypt the line.

Figure 23:
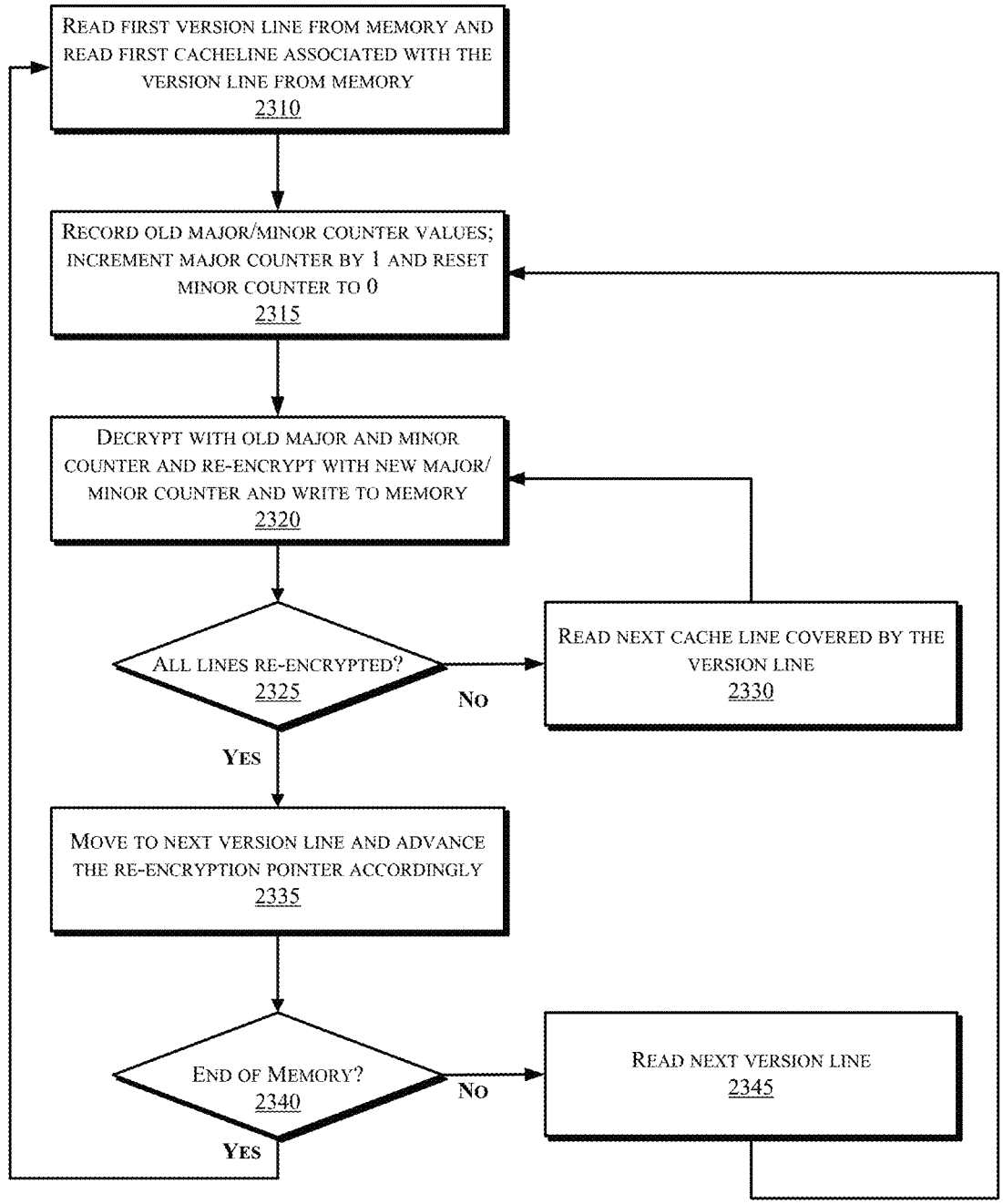
FIG. 23 is a flowchart illustrating operations in a method to implement key rotation in accordance with some embodiments.

FIG. 23 is a flowchart illustrating operations in a method to implement key rotation in accordance with some embodiments. In particular, FIG. 23 illustrates operations in a re-encryption flow for key rotation. In some examples the operations depicted in FIG. 22 may be implemented by the memory encryption engine 212.

Referring to FIG. 23, at operation 2310 a first version line of a cacheline associated with a cache request is read from memory and the first cacheline associated with the version line is read from memory. At operation 2315 the old major/minor counter values are recorded, the major counter is incremented by 1 and the minor counter is reset to zero. At operation 2320 the cacheline is decrypted with the old major counter and minor counter and is re-encrypted with the new major counter and minor counter and written back to memory.

If, at operation 2325, all cache lines have not been re-encrypted then control passes to operation 2330 and the next cache line covered by the version line is read from memory, and control then passes back to operation 2320. Thus, operations 2320-2330 define a loop pursuant to which all cache lines associated with a particular version line are re-encrypted with the new major counter and minor counter.

If, at operation 2325, all lines associated with the current version have been re-encrypted then control passes to operation 2335 and the process moves to the next version line and advances the re-encryption pointer accordingly. If, at operation 2340 the process has not reached the end of memory the control passes to operation 2345 and the next version line is read, and control then passes back to operation 2315. Thus, operations 2315-2345 define a loop pursuant to which all version lines are re-encrypted with the new major counter and minor counter. By contrast, if at operation 2340 the end of the memory is reached then control passes back to operation 2310.

Figure 24:
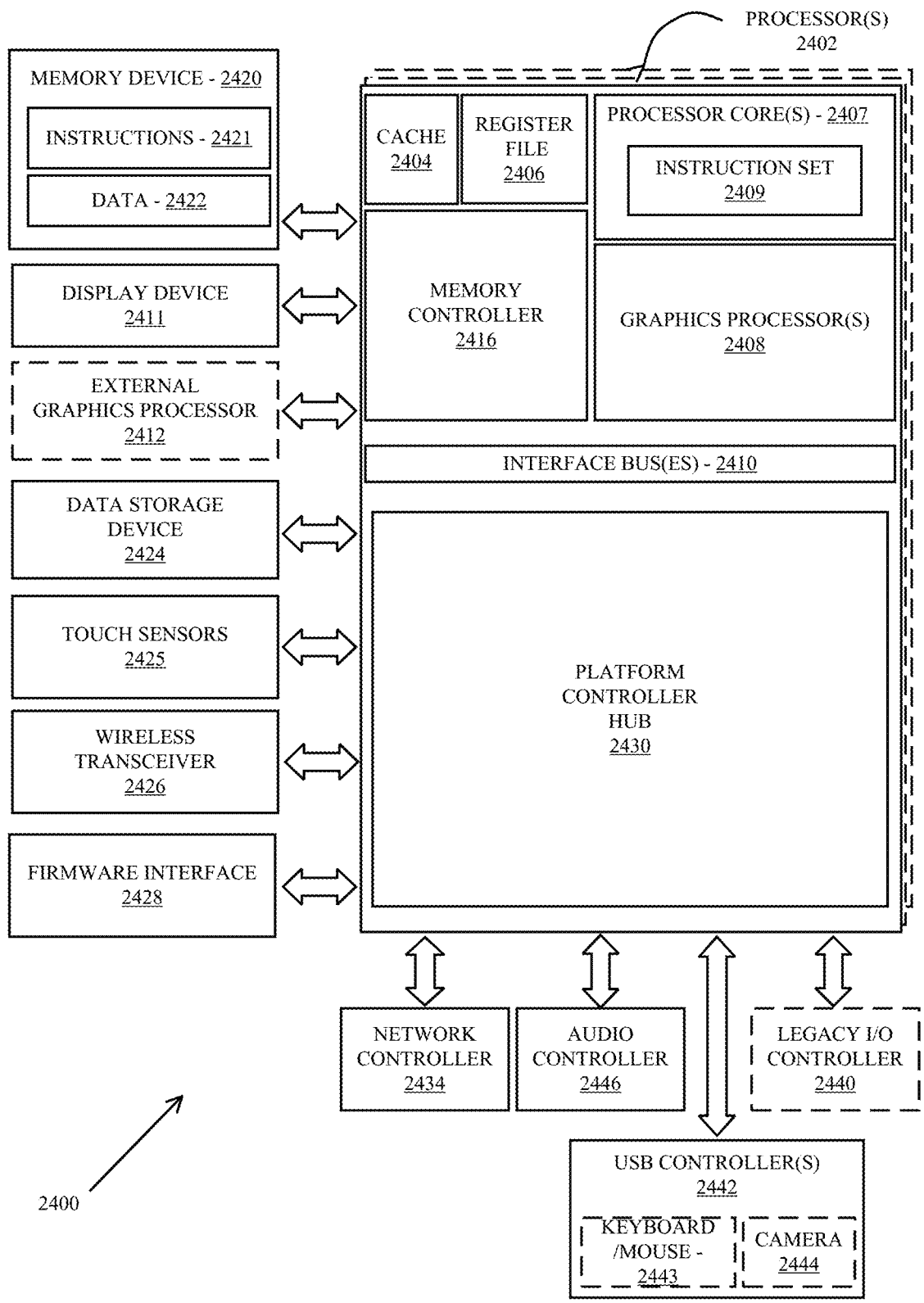
FIG. 24 is a schematic illustration of a computing architecture which may be adapted to implement key rotation in accordance with some embodiments.

FIG. 24 illustrates an embodiment of an exemplary computing architecture that may be suitable for implementing various embodiments as previously described. In various embodiments, the computing architecture 2400 may comprise or be implemented as part of an electronic device. In some embodiments, the computing architecture 2400 may be representative, for example of a computer system that implements one or more components of the operating environments described above. In some embodiments, computing architecture 2400 may be representative of one or more portions or components of a DNN training system that implement one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 2400. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 2400 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 2400.

As shown in FIG. 24, the computing architecture 2400 includes one or more processors 2402 and one or more graphics processors 2408, and may be a single processor desktop system, a multiprocessor workstation system, or a server system having a large number of processors 2402 or processor cores 2407. In on embodiment, the system 2400 is a processing platform incorporated within a system-on-a-chip (SoC or SOC) integrated circuit for use in mobile, handheld, or embedded devices.

An embodiment of system 2400 can include, or be incorporated within, a server-based gaming platform, a game console, including a game and media console, a mobile gaming console, a handheld game console, or an online game console. In some embodiments system 2400 is a mobile phone, smart phone, tablet computing device or mobile Internet device. Data processing system 2400 can also include, couple with, or be integrated within a wearable device, such as a smart watch wearable device, smart eyewear device, augmented reality device, or virtual reality device. In some embodiments, data processing system 2400 is a television or set top box device having one or more processors 2402 and a graphical interface generated by one or more graphics processors 2408.

In some embodiments, the one or more processors 2402 each include one or more processor cores 2407 to process instructions which, when executed, perform operations for system and user software. In some embodiments, each of the one or more processor cores 2407 is configured to process a specific instruction set 2409. In some embodiments, instruction set 2409 may facilitate Complex Instruction Set Computing (CISC), Reduced Instruction Set Computing (RISC), or computing via a Very Long Instruction Word (VLIW). Multiple processor cores 2407 may each process a different instruction set 2409, which may include instructions to facilitate the emulation of other instruction sets. Processor core 2407 may also include other processing devices, such a Digital Signal Processor (DSP).

In some embodiments, the processor 2402 includes cache memory 2404. Depending on the architecture, the processor 2402 can have a single internal cache or multiple levels of internal cache. In some embodiments, the cache memory is shared among various components of the processor 2402. In some embodiments, the processor 2402 also uses an external cache (e.g., a Level-3 (L3) cache or Last Level Cache (LLC)) (not shown), which may be shared among processor cores 2407 using known cache coherency techniques. A register file 2406 is additionally included in processor 2402 which may include different types of registers for storing different types of data (e.g., integer registers, floating point registers, status registers, and an instruction pointer register). Some registers may be general-purpose registers, while other registers may be specific to the design of the processor 2402.

In some embodiments, one or more processor(s) 2402 are coupled with one or more interface bus(es) 2410 to transmit communication signals such as address, data, or control signals between processor 2402 and other components in the system. The interface bus 2410, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 2402 include an integrated memory controller 2416 and a platform controller hub 2430. The memory controller 2416 facilitates communication between a memory device and other components of the system 2400, while the platform controller hub (PCH) 2430 provides connections to I/O devices via a local I/O bus.

Memory device 2420 can be a dynamic random-access memory (DRAM) device, a static random-access memory (SRAM) device, flash memory device, phase-change memory device, or some other memory device having suitable performance to serve as process memory. In one embodiment the memory device 2420 can operate as system memory for the system 2400, to store data 2422 and instructions 2421 for use when the one or more processors 2402 executes an application or process. Memory controller hub 2416 also couples with an optional external graphics processor 2412, which may communicate with the one or more graphics processors 2408 in processors 2402 to perform graphics and media operations. In some embodiments a display device 2411 can connect to the processor(s) 2402. The display device 2411 can be one or more of an internal display device, as in a mobile electronic device or a laptop device or an external display device attached via a display interface (e.g., DisplayPort, etc.). In one embodiment the display device 2411 can be a head mounted display (HMD) such as a stereoscopic display device for use in virtual reality (VR) applications or augmented reality (AR) applications.

In some embodiments the platform controller hub 2430 enables peripherals to connect to memory device 2420 and processor 2402 via a high-speed I/O bus. The I/O peripherals include, but are not limited to, an audio controller 2446, a network controller 2434, a firmware interface 2428, a wireless transceiver 2426, touch sensors 2425, a data storage device 2424 (e.g., hard disk drive, flash memory, etc.). The data storage device 2424 can connect via a storage interface (e.g., SATA) or via a peripheral bus, such as a Peripheral Component Interconnect bus (e.g., PCI, PCI Express). The touch sensors 2425 can include touch screen sensors, pressure sensors, or fingerprint sensors. The wireless transceiver 2426 can be a Wi-Fi transceiver, a Bluetooth transceiver, or a mobile network transceiver such as a 3G, 4G, or Long Term Evolution (LTE) transceiver. The firmware interface 2428 enables communication with system firmware, and can be, for example, a unified extensible firmware interface (UEFI). The network controller 2434 can enable a network connection to a wired network. In some embodiments, a high-performance network controller (not shown) couples with the interface bus 2410. The audio controller 2446, in one embodiment, is a multi-channel high definition audio controller. In one embodiment the system 2400 includes an optional legacy I/O controller 2440 for coupling legacy (e.g., Personal System 2 (PS/2)) devices to the system. The platform controller hub 2430 can also connect to one or more Universal Serial Bus (USB) controllers 2442 connect input devices, such as keyboard and mouse 2443 combinations, a camera 2444, or other USB input devices.

The following pertains to further examples.

Example 1 is an apparatus, comprising a processor comprising an on-die memory, a memory comprising a protected region; and a memory encryption engine comprising processing circuitry to encrypt data stored in the protected region using a message authentication code (MAC) having a first value determined using a first key during a first period of time; generate a replay integrity tree structure comprising security metadata for the data stored in the protected region using the first value of the MAC; and at the end of the first period of time: re-key the MAC to have a second value determined using a second key at the end of the first period of time; decrypt the data stored in the protected region using the first value for the MAC; re-encrypt the data stored in the protected region using the second value for the MAC; and update the replay integrity tree using the second value for the MAC.

In Example 2, the subject matter of Example 1 can optionally include an arrangement wherein a root of the replay integrity tree is stored in the on-die memory.

In Example 3, the subject matter of any one of Examples 1-2 can optionally include an arrangement wherein the security metadata in the replay integrity tree comprises a version seed to be encrypted for use in generated a cipherext version of plaintext data page to be store in the protected region.

In Example 4, the subject matter of any one of Examples 1-3 can optionally include a processor to encrypt the ciphertext version using counter mode encryption.

In Example 5, the subject matter of any one of Examples 1-4 can optionally a processor to receive, from a requestor, a read request directed to access a cache memory address within the protected region of the memory; perform a walk of the replay integrity tree to verify all levels of the replay integrity tree; and return decrypted data to the requestor in response to a determination that all levels of the replay integrity tree are verified.

In Example 6, the subject matter of any one of Examples 1-5 can optionally include a processor to receive, from a requestor, a read request directed to access a cache memory address within the protected region of the memory; perform a walk of the replay integrity tree to verify all levels of the replay integrity tree; and return a security exception in response to a determination that all levels of the replay integrity tree are not verified.

In Example 7, the subject matter of any one of Examples 1-6 can optionally include a processor to receive, from a requestor, a write request directed to access a cache memory address within the protected region of the memory; and perform a walk of the replay integrity tree to verify all levels of the replay integrity tree and increment one or more counters in the tree.

Example 8 is a computer-implemented method, comprising encrypting data to be stored in a protected region of a memory using a message authentication code (MAC) having a first value determined using a first key during a first period of time; generating a replay integrity tree structure comprising security metadata for the data stored in the protected region of the memory using the first value of the MAC; and at the end of the first period of time: re-keying the MAC to have a second value determined using a second key at the end of the first period of time; decrypting the data stored in the protected region using the first value for the MAC; re-encrypting the data stored in the protected region using the second value for the MAC; and updating the replay integrity tree using the second value for the MAC.

In Example 9, the subject matter of Example 8 can optionally include an arrangement wherein a root of the replay integrity tree is stored in the on-die memory.

In Example 10, the subject matter of any one of Examples 8-9 can optionally include an arrangement wherein the security metadata in the replay integrity tree comprises a version seed to be encrypted for use in generated a cipherext version of plaintext data page to be store in the protected region.

In Example 11, the subject matter of any one of Examples 8-10 can optionally include encrypting the ciphertext version using counter mode encryption.

In Example 12, the subject matter of any one of Examples 8-11 can optionally include receiving, from a requestor, a read request directed to access a cache memory address within the protected region of the memory; performing a walk of the replay integrity tree to verify all levels of the replay integrity tree; and returning decrypted data to the requestor in response to a determination that all levels of the replay integrity tree are verified.

In Example 13, the subject matter of any one of Examples 8-12 can optionally include receiving, from a requestor, a read request directed to access a cache memory address within the protected region of the memory; performing a walk of the replay integrity tree to verify all levels of the replay integrity tree; and returning a security exception in response to a determination that all levels of the replay integrity tree are not verified.

In Example 14, the subject matter of any one of Examples 8-13 can optionally include receiving, from a requestor, a write request directed to access a cache memory address within the protected region of the memory; and performing a walk of the replay integrity tree to verify all levels of the replay integrity tree and increment one or more counters in the tree.

Example 15 is a non-transitory computer-readable medium comprising instructions which, when executed by a processor, configure the processor to encrypt data stored in the protected region using a message authentication code (MAC) having a first value determined using a first key during a first period of time; generate a replay integrity tree structure comprising security metadata for the data stored in the protected region using the first value of the MAC; and at the end of the first period of time: re-key the MAC to have a second value determined using a second key at the end of the first period of time; decrypt the data stored in the protected region using the first value for the MAC; re-encrypt the data stored in the protected region using the second value for the MAC; and update the replay integrity tree using the second value for the MAC.

In Example 16, the subject matter of Example 15 can optionally include an arrangement wherein a root of the replay integrity tree is stored in the on-die memory.

In Example 17, the subject matter of any one of Examples 15-16 can optionally include an arrangement wherein the security metadata in the replay integrity tree comprises a version seed to be encrypted for use in generated a cipherext version of plaintext data page to be store in the protected region.

In Example 18, the subject matter of any one of Examples 15-17 can optionally include instructions to encrypt the ciphertext version using counter mode encryption.

In Example 19, the subject matter of any one of Examples 15-18, further comprising instructions which, when executed by the processor, configure the processor to receive, from a requestor, a read request directed to access a cache memory address within the protected region of the memory, perform a walk of the replay integrity tree to verify all levels of the replay integrity tree; and return decrypted data to the requestor in response to a determination that all levels of the replay integrity tree are verified.

In Example 20, the subject matter of any one of Examples 15-19 can optionally include instructions to receive, from a requestor, a read request directed to access a cache memory address within the protected region of the memory; perform a walk of the replay integrity tree to verify all levels of the replay integrity tree; and return a security exception in response to a determination that all levels of the replay integrity tree are not verified.

In Example 21, the subject matter of any one of Examples 15-20 can optionally include instructions to receive, from a requestor, a write request directed to access a cache memory address within the protected region of the memory; and perform a walk of the replay integrity tree to verify all levels of the replay integrity tree and increment one or more counters in the tree.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus, comprising:
a processor comprising an on-die memory;
a memory comprising a protected region; and
a memory encryption engine comprising processing circuitry to:
encrypt data stored in the protected region using a message authentication code (MAC) having a first value determined using a first key during a first period of time;
generate a replay integrity tree structure comprising security metadata for the data stored in the protected region using the first value of the MAC; and
at the end of the first period of time:
re-key the MAC to have a second value determined using a second key at the end of the first period of time;
decrypt the data stored in the protected region using the first value for the MAC;
re-encrypt the data stored in the protected region using the second value for the MAC; and
update the replay integrity tree using the second value for the MAC.

2. The apparatus of claim 1, wherein a root of the replay integrity tree is stored in the on-die memory.

3. The apparatus of claim 1, the memory encryption engine to:
the security metadata in the replay integrity tree comprises a version seed to be encrypted for use in generated a cipherext version of plaintext data page to be store in the protected region.

4. The apparatus of claim 3, the memory encryption engine to:
encrypt the ciphertext version using counter mode encryption.

5. The apparatus of claim 4, the memory encryption engine to:
receive, from a requestor, a read request directed to access a cache memory address within the protected region of the memory;
perform a walk of the replay integrity tree to verify all levels of the replay integrity tree; and
return decrypted data to the requestor in response to a determination that all levels of the replay integrity tree are verified.

6. The apparatus of claim 4, the memory encryption engine to:
receive, from a requestor, a read request directed to access a cache memory address within the protected region of the memory;
perform a walk of the replay integrity tree to verify all levels of the replay integrity tree; and
return a security exception in response to a determination that all levels of the replay integrity tree are not verified.

7. The apparatus of claim 4, the memory encryption engine to:
receive, from a requestor, a write request directed to access a cache memory address within the protected region of the memory; and
perform a walk of the replay integrity tree to verify all levels of the replay integrity tree and increment one or more counters in the tree.

8. A computer-implemented method, comprising:
encrypting data to be stored in a protected region of a memory using a message authentication code (MAC) having a first value determined using a first key during a first period of time;
generating a replay integrity tree structure comprising security metadata for the data stored in the protected region of the memory using the first value of the MAC; and
at the end of the first period of time:

re-keying the MAC to have a second value determined using a second key at the end of the first period of time;
decrypting the data stored in the protected region using the first value for the MAC;
re-encrypting the data stored in the protected region using the second value for the MAC; and
updating the replay integrity tree using the second value for the MAC.

9. The computer-implemented method of claim 8, wherein a root of the replay integrity tree is stored in the on-die memory.

10. The computer-implemented method of claim 8, wherein:
the security metadata in the replay integrity tree comprises a version seed to be encrypted for use in generated a cipherext version of plaintext data page to be store in the protected region.

11. The computer-implemented method of claim 10, further comprising:
encrypting the ciphertext version using counter mode encryption.

12. The computer-implemented method of claim 11, further comprising:
receiving, from a requestor, a read request directed to access a cache memory address within the protected region of the memory;
performing a walk of the replay integrity tree to verify all levels of the replay integrity tree; and
returning decrypted data to the requestor in response to a determination that all levels of the replay integrity tree are verified.

13. The computer-implemented method of claim 11, further comprising:
receiving, from a requestor, a read request directed to access a cache memory address within the protected region of the memory;
performing a walk of the replay integrity tree to verify all levels of the replay integrity tree; and
returning a security exception in response to a determination that all levels of the replay integrity tree are not verified.

14. The computer-implemented method of claim 11, further comprising:
receive, from a requestor, a write request directed to access a cache memory address within the protected region of the memory;
perform a walk of the replay integrity tree to verify all levels of the replay integrity tree and increment one or more counters in the tree.

15. A non-transitory computer-readable medium comprising instructions which, when executed by a processor, configure the processor to:
encrypt data to be stored in a protected region of a memory using a message authentication code (MAC) having a first value determined using a first key during a first period of time;
generate a replay integrity tree structure comprising security metadata for the data stored in the protected region of the memory using the first value of the MAC; and
at the end of the first period of time:
re-key the MAC to have a second value determined using a second key at the end of the first period of time;
decrypt the data stored in the protected region using the first value for the MAC;
re-encrypt the data stored in the protected region using the second value for the MAC; and
update the replay integrity tree using the second value for the MAC.

16. The non-transitory computer-readable medium of claim 15, wherein a root of the replay integrity tree is stored in the on-die memory.

17. The non-transitory computer-readable medium of claim 15, wherein:
the security metadata in the replay integrity tree comprises a version seed to be encrypted for use in generated a cipherext version of plaintext data page to be store in the protected region.

18. The non-transitory computer-readable medium of claim 17, further comprising instructions which, when executed by the processor, configure the processor to:
encrypting the ciphertext version using counter mode encryption.

19. The non-transitory computer-readable medium of claim 11, further comprising instructions which, when executed by the processor, configure the processor to:
receiving, from a requestor, a read request directed to access a cache memory address within the protected region of the memory;
performing a walk of the replay integrity tree to verify all levels of the replay integrity tree; and
returning decrypted data to the requestor in response to a determination that all levels of the replay integrity tree are verified.

20. The non-transitory computer-readable medium of claim 12, further comprising instructions which, when executed by the processor, configure the processor to:
receiving, from a requestor, a read request directed to access a cache memory address within the protected region of the memory;
performing a walk of the replay integrity tree to verify all levels of the replay integrity tree; and
returning a security exception in response to a determination that all levels of the replay integrity tree are not verified.

21. The non-transitory computer-readable medium of claim 13, further comprising instructions which, when executed by the processor, configure the processor to:
receive, from a requestor, a write request directed to access a cache memory address within the protected region of the memory; and
perform a walk of the replay integrity tree to verify all levels of the replay integrity tree and increment one or more counters in the tree.

* * * * *